US008542932B2

(12) United States Patent
Furuta

(10) Patent No.: US 8,542,932 B2
(45) Date of Patent: Sep. 24, 2013

(54) IMAGE PROCESSING METHOD AND IMAGE PROCESSING APPARATUS USING DIFFERENT COMPRESSION METHODS

(75) Inventor: Yasuhiro Furuta, Shimosuwa-machi (JP)

(73) Assignee: Seiko Epson Corporation, Tokyo (JP)

(*) Notice: Subject to any disclaimer, the term of this patent is extended or adjusted under 35 U.S.C. 154(b) by 575 days.

(21) Appl. No.: 12/778,988

(22) Filed: May 12, 2010

(65) Prior Publication Data

US 2010/0290712 A1 Nov. 18, 2010

(30) Foreign Application Priority Data

May 13, 2009 (JP) ................... 2009-116956
Sep. 15, 2009 (JP) ................... 2009-213430
Apr. 9, 2010 (JP) ................... 2010-090153

(51) Int. Cl.
*G06K 9/36* (2006.01)
*G06T 17/00* (2006.01)

(52) U.S. Cl.
USPC .......................... 382/232; 345/420

(58) Field of Classification Search
USPC .......................... 382/232; 345/420
See application file for complete search history.

(56) References Cited

U.S. PATENT DOCUMENTS

| | | | | |
|---|---|---|---|---|
| 5,117,287 A | * | 5/1992 | Koike et al. | 348/402.1 |
| 5,394,191 A | * | 2/1995 | Sirat et al. | 348/571 |
| 5,533,140 A | * | 7/1996 | Sirat et al. | 382/108 |
| 5,929,859 A | * | 7/1999 | Meijers | 345/419 |
| 6,055,330 A | * | 4/2000 | Eleftheriadis et al. | 382/154 |
| 6,057,850 A | * | 5/2000 | Kichury | 345/584 |
| 6,134,346 A | * | 10/2000 | Berman et al. | 382/163 |
| 6,281,903 B1 | * | 8/2001 | Martin et al. | 345/421 |
| 6,330,281 B1 | * | 12/2001 | Mann et al. | 375/240.12 |
| 6,331,852 B1 | * | 12/2001 | Gould et al. | 345/419 |
| 6,480,538 B1 | * | 11/2002 | Trovato | 375/240.01 |
| 6,573,890 B1 | * | 6/2003 | Lengyel | 345/419 |
| 6,611,262 B1 | * | 8/2003 | Suzuki | 345/419 |
| 6,738,424 B1 | * | 5/2004 | Allmen et al. | 375/240.08 |
| 6,879,266 B1 | * | 4/2005 | Dye et al. | 341/51 |
| 6,999,073 B1 | * | 2/2006 | Zwern et al. | 345/420 |
| 7,027,647 B2 | * | 4/2006 | Mukherjee et al. | 382/173 |
| 7,265,761 B2 | * | 9/2007 | Chou et al. | 345/586 |
| 7,463,269 B2 | * | 12/2008 | Hong et al. | 345/582 |
| 7,916,147 B2 | * | 3/2011 | Clemie et al. | 345/522 |
| 2001/0028744 A1 | * | 10/2001 | Han et al. | 382/232 |
| 2003/0001838 A1 | * | 1/2003 | Han et al. | 345/419 |
| 2003/0218606 A1 | * | 11/2003 | Zhirkov et al. | 345/419 |
| 2004/0217956 A1 | * | 11/2004 | Besl et al. | 345/419 |

(Continued)

FOREIGN PATENT DOCUMENTS

| | | |
|---|---|---|
| JP | 07-152925 A | 6/1995 |
| JP | 2004-229321 A | 8/2004 |
| JP | 2006-211513 A | 8/2006 |

*Primary Examiner* — Wenpeng Chen
(74) *Attorney, Agent, or Firm* — Kilpatrick Townsend & Stockton LLP

(57) ABSTRACT

An image processing method of processing image portrayal information used for rendering by attaching textures includes separating a texture area to which the texture is attached and a non-texture area to which the texture is not attached in a coordinate system of a rendering-completed image represented by the image portrayal information, compressing the image portrayal information of the non-texture area by a first compression method, and compressing the image portrayal information of the texture area by a second compression method different from the first compression method.

12 Claims, 16 Drawing Sheets

(56) References Cited

U.S. PATENT DOCUMENTS

| | | | |
|---|---|---|---|
| 2005/0063596 A1* | 3/2005 | Yomdin et al. | 382/232 |
| 2005/0104889 A1* | 5/2005 | Clemie et al. | 345/522 |
| 2006/0017722 A1* | 1/2006 | Hong et al. | 345/419 |
| 2008/0037829 A1* | 2/2008 | Givon | 382/107 |
| 2008/0246759 A1* | 10/2008 | Summers | 345/420 |
| 2009/0021513 A1* | 1/2009 | Joshi et al. | 345/419 |
| 2009/0208110 A1* | 8/2009 | Hoppe et al. | 382/190 |
| 2009/0310023 A1* | 12/2009 | Nakayama | 348/584 |
| 2010/0039556 A1* | 2/2010 | Au et al. | 348/452 |
| 2010/0060640 A1* | 3/2010 | Melikian et al. | 345/427 |

\* cited by examiner

FIG. 2A
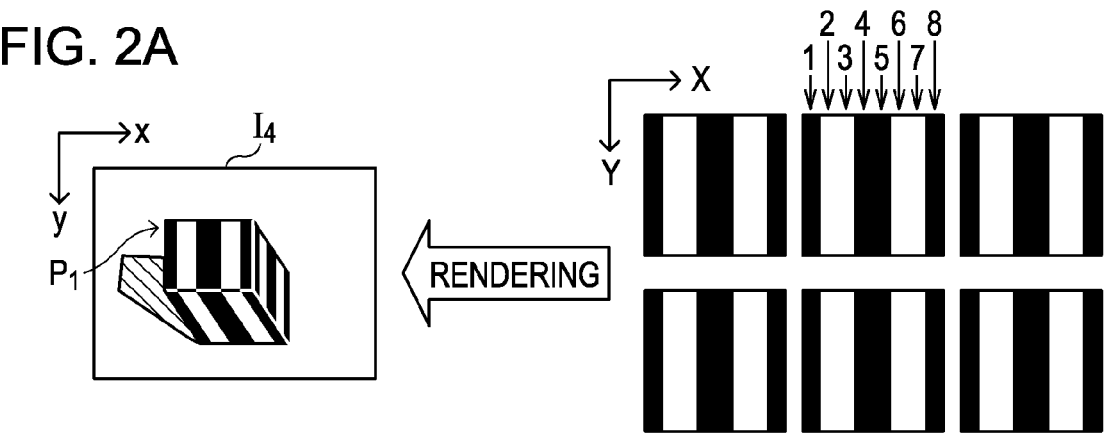
FIG. 2B
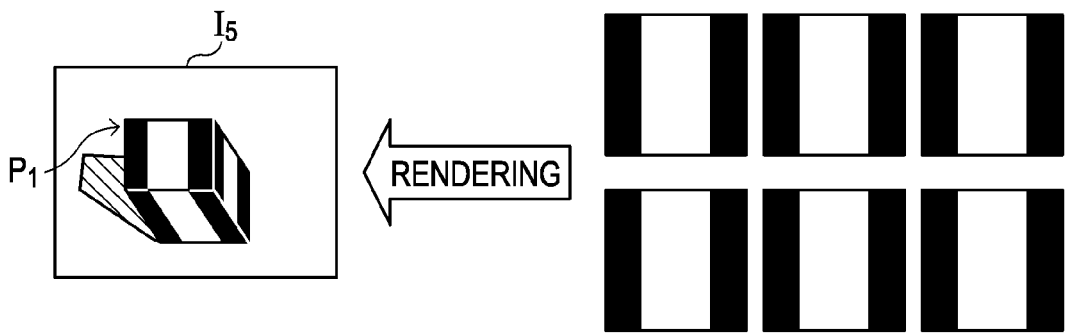
FIG. 2C
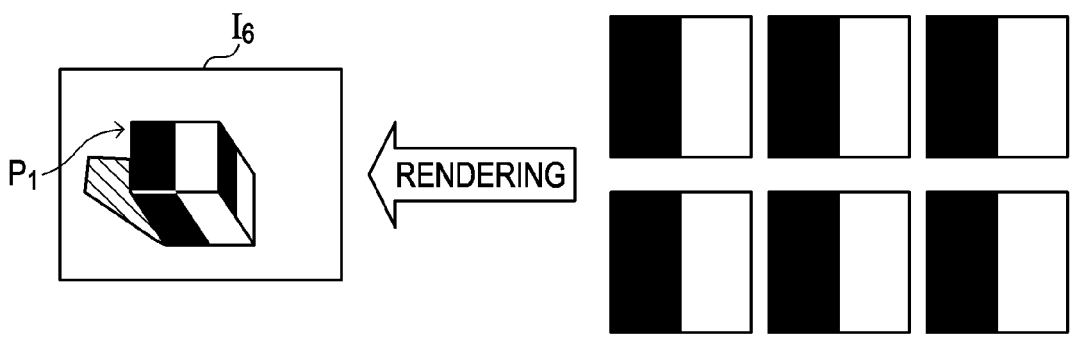
FIG. 2D
| X | 1 | 2 | 3 | 4 | 5 | 6 | 7 | 8 |
|---|---|---|---|---|---|---|---|---|
| LOWEST BIT | 0 | 1 | 1 | 0 | 0 | 1 | 1 | 0 |
| MEDIUM BIT | 0 | 0 | 1 | 1 | 1 | 1 | 0 | 0 |
| HIGHEST BIT | 0 | 0 | 0 | 0 | 1 | 1 | 1 | 1 |

TEXTURE NUMBER
1     2     3

TEXTURE NUMBER 1      TEXTURE NUMBER 3

TEXTURE NUMBER 2

IMAGE PROCESSING METHOD AND IMAGE PROCESSING APPARATUS USING DIFFERENT COMPRESSION METHODS

This application claims priority to Japanese Patent Application No. 2009-116956, filed May 13, 2009, Japanese Patent Application No. 2009-213430, filed Sep. 15, 2009 and Japanese Patent Application No. 2010-090153, filed Apr. 9, 2010. The entireties of each of the aforementioned applications are hereby incorporated by reference herein.

BACKGROUND

1. Technical Field

The present invention relates to an image processing method and an image processing apparatus for processing image data used for rendering by attaching textures.

2. Related Art

Hitherto, as such an image processing method, it is disclosed that a 3-dimensional model is rendered in real time and displayed on a display in JP-A-07-152925, or it is disclosed that a 3-dimensional model is rendered in advance, a bitmap image is produced and stored, and the bitmap image is read to be displayed on a display device.

In the former method, it is necessary to perform the rendering process in a shorter period than the display period of the screen, and high operation capability is necessary. Therefore, depending on the computer operation capability may be insufficient, and high quality rendering such as ray tracing cannot be performed. Meanwhile, in the latter method, only the bitmap image is displayed, and a high quality image can be displayed since the rendering is performed in advance with high quality and the bitmap image is produced. However, in its current state, textures cannot be replaced. Such image data has a large size, and has to be efficiently managed according to the capacity of the installed memory.

SUMMARY

An advantage of some aspects of the invention is to efficiently manage a rendering image of a 3-dimensional model. The image processing method and the image processing apparatus according to some aspects of the invention employ the following means.

According to an aspect of the invention, there is provided an image processing method of processing image portrayal information used for rendering by attaching textures, the method including: separating a texture area to which the texture is attached and a non-texture area to which the texture is not attached in a coordinate system of a rendering-completed image represented by the image portrayal information; compressing the image portrayal information of the non-texture area by a first compression method; and compressing the image portrayal information of the texture area by a second compression method different from the first compression method. With such a configuration, it is possible to efficiently manage the rendering image of a 3-dimensional model.

Pixels of a part other than the non-texture area may be interpolated by a predetermined interpolating process such that a pixel value is gradually changed from the boundary of the non-texture area, the image portrayal information after the interpolating may be compressed by a JPEG compression method that is the first compression method, and the image portrayal information of the texture area may be compressed by a lossless compression method that is the second compression method. With such a configuration, it is possible to improve image quality while raising the compression rate of the whole image data.

In the image processing method according to the aspect of the invention, the predetermined interpolating process may be a interpolating process in which an area other than the non-texture area is filled with the average pixel value of adjacent pixels.

In the image processing method according to the aspect of the invention, the predetermined interpolating process may be a interpolating process in which the image portrayal information is configured by a plurality of unit blocks with a predetermined size, an area other than the non-texture area is filled with an average pixel value of adjacent pixels with respect to a block, in which a part of the non-texture area is included, of the plurality of unit blocks, and all pixels of the unit blocks are filled with an average pixel value of pixels in the adjacent blocks with respect to a block, in which the non-texture area is not included. With such a configuration, it is possible to raise the compression rate by a simple process.

In the image processing method according to the aspect of the invention, rendering may be performed by attaching a predetermined pattern with different grayscale values set for each coordinate to a 3-dimensional model as textures, correspondence of coordinates of the rendering-completed image and coordinates of textures may be set by analyzing a rendering-completed image obtained as a bitmap image by the rendering, and may be stored as the image portrayal information, and a desired texture may be disposed on the rendering-completed image on the basis of the stored image portrayal information at the time of displaying the desired texture as an image. With such a configuration, the image obtained by rendering the 3-dimensional model can be displayed by replacing the desired texture, and it is possible to reduce the processing burden as compared to rendering and displaying the 3-dimensional model in real time. In this case, the displaying of the image includes portraying the image by a frame unit and displaying it as a moving image. In the image processing method according to the aspect of the invention, the correspondence may be deduced from the grayscale value of each coordinate of the rendering-completed image by specifying coordinates of the corresponding predetermined pattern. In the image processing method according to the aspect of the invention, the predetermined pattern may be a pattern with the same number as a bit number when the texture coordinates are represented by binary numbers, each bit when coordinates are represented by binary numbers may be associated with each pattern, and a grayscale value of each coordinate of each pattern may be set to a value based on the value of the associated bit. With such a configuration, it is possible to more accurately set the correspondence. In this case, the binary numbers may be gray codes (reflected binary number). With such a configuration, it is possible to prevent erroneous data from being acquired due to an error of the grayscale value of the image since only 1-bit change occurs when transferring to adjacent coordinates. In the image processing method according to the aspect of the invention, rendering may be performed by attaching a first solid painting pattern formed by solid painting with a minimum grayscale value to the 3-dimensional model in addition to a correspondence setting pattern for setting the correspondence of coordinates of the rendering-completed image and coordinates of the textures as the predetermined pattern, a bias value that is the grayscale value of the first solid painting pattern in the rendering-completed image may be stored as the image portrayal information representing the correspondence of the color of each pixel of the rendering-completed image and the color of each pixel of the texture image, and the grayscale value of the desired texture may be converted into the grayscale value of the rendering-completed image by offsetting on the basis of the stored bias value. With such a configuration, it is possible to reflect an effect which does not depend on the original texture among the effects based on the rendering of the 3-dimensional model. In this case, pixels of a part other than the non-texture area may be interpolated by a predetermined interpolating process such that a pixel value is gradually changed from a boundary of the non-texture area, the bias value after the interpolating may be compressed by a JPEG compression method that is the first compression method, and the bias value of the texture area may be compressed by a lossless compression method that is the second compression method. In the image processing method according to the aspect of the invention, rendering may be performed by attaching a first solid painting pattern formed by solid painting with a minimum grayscale value and a second solid painting pattern formed by solid painting with a maximum grayscale value to the 3-dimensional model in addition to a correspondence setting pattern for setting correspondence of coordinates of the rendering-completed image and coordinates of the textures as the predetermined pattern, a gain that may be a difference of the grayscale value of the second solid painting pattern and the grayscale value of the first solid painting pattern in the rendering-completed image may be calculated and stored as the image portrayal information representing correspondence of a color of each pixel of the rendering-completed image and a color of each pixel of the texture image, and the grayscale value of the desired texture may be converted into the grayscale value of the rendering-completed image on the basis of the stored gain. With such a configuration, it is possible to reflect the influence on the grayscale value of the original texture of the effects caused by the rendering of the 3-dimensional model. In this case, when n (n is a natural number) textures are disposed on the rendering-completed image and the rendering-completed image is displayed, n sets formed of (n−1) sheets of the first solid painting pattern and 1 sheet of the second solid painting pattern may be set, a first set group with a different part where the second solid painting pattern is attached to the 3-dimensional model for each set and a second set formed of n sheets of the first solid painting pattern may be attached to the 3-dimensional model for each set to perform rendering, the grayscale value of the rendering-completed image obtained by rendering the first set group may be compared with the grayscale value of the rendering-completed image obtained by rendering the second set for each set of the first set group to specify a texture area that is an area where the texture is attached to the 3-dimensional model, and a gain may be calculated for the specified texture area. With such a configuration, it is possible to more easily specify the texture area. In addition, when the texture and the rendering-completed image are formed of a plurality of color components (e.g., 3 colors), the rendering is performed by attaching the first set group to the 3-dimensional model with respect to the color components, and the gain may be calculated for the color components. According to another aspect of the invention, there is provided an image processing apparatus for processing image portrayal information used for rendering by attaching textures, the apparatus including: a separating unit that separates a texture area to which the texture is attached and a non-texture area to which the texture is not attached in a coordinate system of a rendering-completed image represented by the image portrayal information; a first compression unit that compresses the image portrayal information of the non-texture area by a first compression method; and a second compression unit that compresses the image portrayal information of the texture area by a second compression method different from the first compression method.

In the image processing apparatus according to the aspect of the invention, it is possible to select a compression method for each area of the image portrayal information representing the correspondence of the texture and the rendering-completed image, and it is possible to efficiently manage the rendering image of the 3-dimensional model.

BRIEF DESCRIPTION OF THE DRAWINGS

The invention will be described with reference to the accompanying drawings, wherein like numbers reference like elements.

FIG. 2A to FIG. 2D are diagrams illustrating special textures.

DESCRIPTION OF EXEMPLARY EMBODIMENTS

Hereinafter, an embodiment of the invention will be described.

The embodiment of the invention is a technique relating to a rendering process of attaching 2-dimensional textures to a virtual 3-dimensional structure and creating a 2-dimensional image (hereinafter, referred to as a rendering-completed image) representing a state of the 3-dimensional structure after the attaching as viewed in a predetermined direction. That is, the embodiment of the invention is a type for providing a compression method of efficiently managing image data used at the time of performing the rendering process, and the compression method is applied to a case where a rendering-completed image in which a texture area where a texture is attached and an area in which the texture is not attached coexist is created by the rendering process.

In the embodiment, to make it possible to perform the rendering process with fewer resources, the rendering-completed image after the textures are attached to the 3-dimensional model is compared, a coefficient for creating the rendering-completed image from the texture having been defined in advance as image portrayal information.

The coefficient is a formula prescribing correspondence of positions of pixels of an arbitrary texture and positions of pixels of the rendering-completed image, and variation in color between pixels, and is calculated by the following processes.

A. Specification of Attached Texture
B. Specification of Influence which Rendering Process Has on Brightness
C. Specification of Correspondence of Positions of Pixels The processes are performed using a predetermined pattern texture (hereinafter, referred to as a special texture) created to specify the coefficient, which is not an arbitrary texture. The size (the number of vertical and horizontal pixels) of the special texture is set with the same number as the number of the 2-dimensional textures. Hereinafter, the processes (A) to (C) will be described.

A. Specification of Attached Texture

Figure 1A:
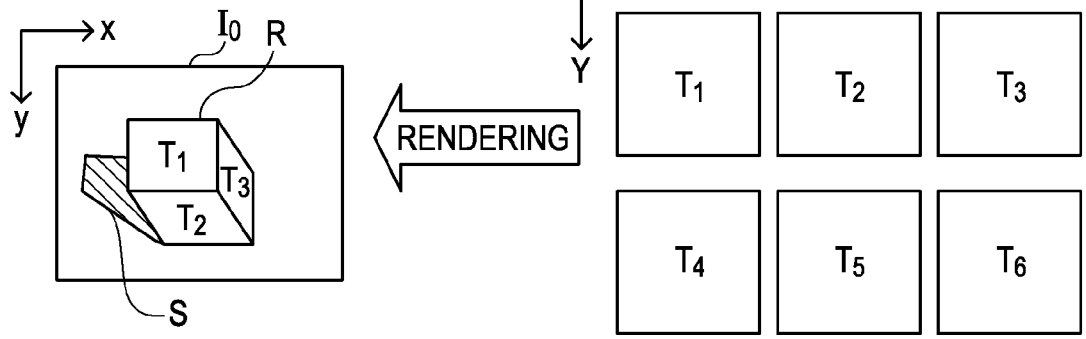
FIG. 1A to FIG. 1D are diagrams illustrating special textures.

FIG. 1A is a diagram illustrating an outline of a rendering process. In the rendering process of the embodiment, it is assumed that n (n is a natural number) 2-dimensional textures are attached to a virtual 3-dimensional structure, and a 2-dimensional image as viewing the 3-dimensional structure with the textures attached in a predetermined direction is a rendering-completed image. Accordingly, in the rendering-completed image, maximum n textures are visible according to the direction of the 3-dimensional structure. In FIG. 1A, a rendering-completed image is represented by $I_0$ when 2-dimensional textures $T_1$ to $T_6$ are attached to a virtual rectangular parallelepiped R, an example in which 3 textures $T_1$ to $T_3$ of 6 textures $T_1$ to $T_6$ are visible is shown. In the example shown in FIG. 1A, it is assumed that the virtual rectangular parallelepiped R is placed on a base, a shadow S of the rectangular parallelepiped R is formed on the base.

The rendering process is realized by attaching a specific texture to a specific face of the 3-dimensional structure, and necessarily one texture corresponds to coordinates in which there is the rendering-completed image, and a plurality of textures do not correspond thereto. That is, the coordinates of the rendering-completed image and the coordinates of the texture are in 1-to-1 correspondence. In the embodiment, n special textures, one specific sheet of which is white and the other sheets than the one specific sheet are black, are created, and special textures, all of n sheets of which are black, are created. The position of the rendering-completed image corresponding to the one specific white texture is specified by comparing the rendering-completed images. Herein, the white special texture corresponds to a second solid painting pattern, and the black special texture corresponds to a first solid painting pattern.

Figure 1B:
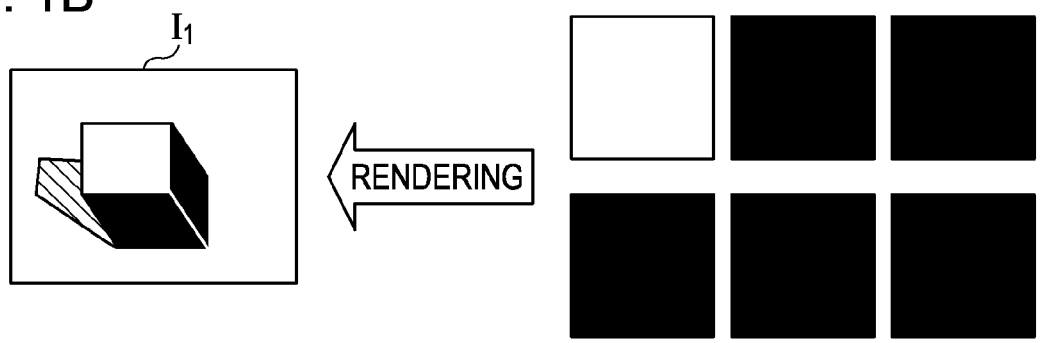
Figure 1C:
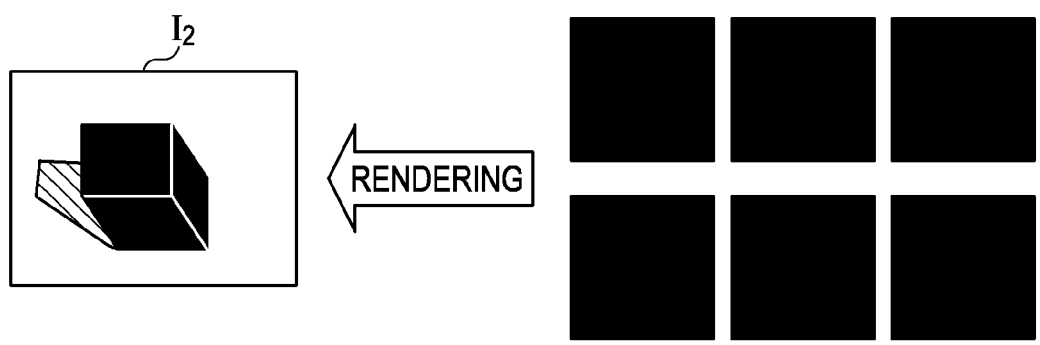
Figure 1D:
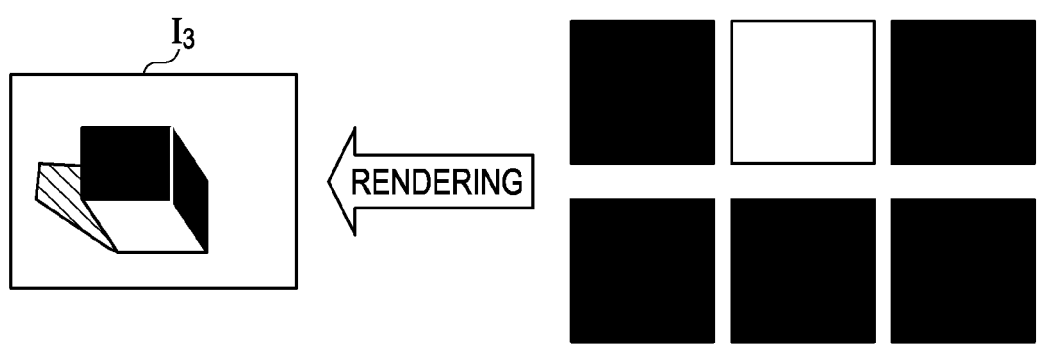

FIG. 1B to FIG. 1D show examples of special textures attached instead of the textures $T_1$ to $T_6$ shown in FIG. 1A, with 6 rectangles shown on the right side. FIG. 1B shows an example in which only the special texture corresponding to the texture $T_1$ is white, and the special textures corresponding to the textures $T_2$ to $T_6$ are black. FIG. 1C shows an example in which the special textures corresponding to the textures $T_1$ to $T_6$ are black. The rendering-completed images created by the rendering process based on the special textures shown in FIG. 1B and FIG. 1C are shown as $I_1$ and $I_2$.

In the embodiment, the position of the rendering-completed image corresponding to the special textures of the second solid painting pattern is specified by comparing the rendering-completed images $I_1$ and $I_2$ created as described above. That is, when comparing brightness of the rendering-completed images $I_1$ and $I_2$ for each pixel of the rendering-completed images, a difference in brightness occurs for pixels to which the special texture of the second solid painting pattern is attached. However, no difference occurs for pixels to which the special texture of the first solid painting pattern is attached. For example, when a process of determining whether or not the brightness of the rendering-completed image $I_1$ is higher than the brightness of the rendering-completed image $I_2$ is performed on each pixel, it can be determined that the special texture of the second solid painting pattern is attached to the pixel for which it is determined that the brightness of the rendering-completed image $I_1$ is higher than the brightness of the rendering-completed image $I_2$.

That is, the position of the rendering-completed image corresponding to the texture $T_1$ is specified by comparing the rendering-completed image $I_1$ in the case of performing the rendering process using the texture $T_1$ as the special texture of the second solid painting pattern as shown in FIG. 1B, and the rendering-completed image $I_2$ in the case of performing the rendering process using all of the textures as the special textures of the first solid painting pattern as shown in FIG. 1C. Similarly, the position of the rendering-completed image corresponding to the texture $T_2$ is specified by comparing the rendering-completed image $I_3$ and the rendering-completed image $I_2$ in the case of performing the rendering process using the texture $T_2$ as the special texture of the second solid painting pattern as shown in FIG. 1D. Accordingly, when the process is performed on each of the rendering-completed images formed by rendering the special textures in which any one of n textures is white and the others are black, the positions to which n textures are attached are specified in the rendering-completed image.

B. Specification of Influence which Rendering Process has on Brightness

Next, an influence which the rendering process has on brightness is specified for each pixel of the rendering-completed image. In the rendering process shown in FIG. 1A, after the textures $T_1$ to $T_6$ are attached to the virtual 3-dimensional structure, a brightness value of the rendering-completed image is specified by considering that a predetermined influence has on light from a light source set at a virtual position or shade caused by the shape of the 3-dimensional structure. Accordingly, the predetermined influence can be prescribed for each pixel of the rendering-completed image. In the embodiment, it is considered that the brightness value of each pixel of the rendering-completed image is prescribed by the sum of a constant number component (hereinafter, referred to as a bias B) which does not depend on the textures $T_1$ to $T_6$ and a proportional component (hereinafter, referred to as a gain G) which is proportional to the brightness of the textures $T_1$ to $T_6$.

When the bias B and the gain G are specified for each pixel of the rendering-completed image, the influence which the rendering process has on the brightness can be specified. The influence can be specified using the rendering-completed image $I_2$ subjected to the rendering process by replacing all of n textures by the special texture of the first solid painting pattern as shown in FIG. 1C, and the rendering-completed images $I_1$ and $I_3$ subjected to the rendering process by replacing one specific sheet of n textures by the special texture of the second solid painting pattern and replacing the others by the special texture of the first solid painting pattern as shown in FIG. 1B and FIG. 1D.

That is, in the rendering-completed image $I_2$ shown in FIG. 1C, all of n sheets are the special texture of the first solid painting pattern. When the brightness value becomes a significant value (brightness value larger than 0) in each pixel of the rendering-completed image created by attaching the special textures of the first solid painting pattern to the virtual 3-dimensional structure, it can be known that the brightness value is the significant value without being affected by the original texture. The brightness value in each pixel of the rendering-completed image created by attaching the special texture of the first solid painting pattern to the virtual 3-dimensional structure can be defined as the bias B.

When the bias B is reduced from the brightness value in each pixel of the rendering-completed image corresponding to the part to which the special texture of the second solid painting pattern is attached, the gain G can be specified. Thus, the gain G of each pixel is specified by reducing the bias B from each pixel of the rendering-completed image corresponding to the position to which the special texture of the second solid painting pattern is attached.

C. Specification of Correspondence of Position of Pixel

Next, correspondence of positions of pixels before and after rendering is specified. That is, the correspondence of the position of each pixel of the texture and the position of each pixel of the rendering-completed image is specified. The specification of the correspondence is performed by associating coordinates (x, y) of the rendering-completed image with coordinates (X, Y) of the texture on the basis of the rendering-completed image formed by rendering the special texture. In the embodiment, the specification of the correspondence is performed by a process of specifying correspondence of x coordinates and X coordinates and a process of specifying correspondence of y coordinates and Y coordinates, and special textures (correspondence setting pattern) for performing the former and later processes are created.

FIG. 2A to FIG. 2C are diagrams illustrating examples of the special textures created to specify the correspondence of x coordinates and X coordinates. In FIG. 2A to FIG. 2C, a coordinate system is employed in which horizontal positions of pixels are prescribed by X coordinates and x coordinates, and vertical positions of pixels are prescribed by Y coordinates and y coordinates. Since it is assumed that the range of values of the textures are 1 to 8 in all of X coordinates and Y coordinates, the range of values of the special textures also are 1 to 8 in all of X coordinates and Y coordinates. In FIG. 2A, the values of X coordinates in one special texture are shown by arrows. The special textures created to specify the correspondence of x coordinates and X coordinates have the same pattern for all of n textures. For example, an example shown in FIG. 2A is an example of special textures created in the case where 6 textures $T_1$ to $T_6$ are attached to the virtual 3-dimensional structure as shown in FIG. 1A. In the example shown in FIG. 2A, the patterns of the special textures considered instead of the 6 textures $T_1$ to $T_6$ are the same.

In the special textures created to specify the correspondence of x coordinates and X coordinates, the patterns are created with the same number as a bit number of X coordinates. For example, in the example shown in FIG. 2A to FIG. 2C, the range of values of X coordinates are 1 to 8 and 3 bits, and thus 3 kinds of special textures are created. That is, the patterns of the special textures in FIG. 2A, FIG. 2B, and FIG. 2C are different patterns, but patterns of n special textures are the same when comparing special textures shown in FIG. 2A.

In the embodiment, the 3 kinds of patterns of special textures are set such that permutations of brightness obtained by sequentially extracting brightness of the same X coordinate value from 3 kinds of special textures are different in all of the X coordinate values. For example, the permutation obtained by extracting brightness of X coordinate value 1 in order of FIG. 2A, FIG. 2B, and FIG. 2C is (black, black, black), and the permutation obtained by extracting brightness of X coordinate value 2 in order of FIG. 2A, FIG. 2B, and FIG. 2C is (white, black, black). When the patterns of the special textures are set such that the permutations for all of X coordinate values are different, it is possible to specify the X coordinate value of the original special texture on the basis of the brightness value in each coordinate of 3 kinds of rendering-completed images after rendering the 3 kinds of special textures. For example, when the permutation of brightness of the original special texture is specified by sequentially referring to the brightness values in each coordinate of 3 kinds of rendering-completed images, it is possible to specify the X coordinate value of the special texture corresponding to each coordinate of the rendering-completed image.

More specifically, in the example shown in FIG. 2A to FIG. 2C, the permutation of brightness of the original special texture obtained by extracting the brightness values at the position $P_1$ of the rendering-completed images $I_4$, $I_5$, and $I_6$ is (black, black, black). The permutation corresponds to the brightness of the X coordinate value 1 of the original special texture, and the brightness of the other X coordinate values does not correspond to this permutation. Accordingly, at the position $P_1$ of the rendering-completed image from which this permutation is extracted, it is possible to specify that the image with the X coordinate value 1 of the special texture is attached.

In the embodiment, n special textures of the patterns with the same number as a bit number of X coordinates of the special texture are created, the rendering-process is performed, and the brightness values of the positions of the rendering-completed images specified as any one of the n textures attached by the above-described (A) are sequentially extracted. The correspondence of x coordinates and X coordinates is specified by specifying the X coordinate value of the original special texture on the basis of the extracted permutation.

For example, it is preferable to specify the correspondence of x coordinates and X coordinates by representing the X coordinate values by gray codes. The patterns of the special textures shown in FIG. 2A to FIG. 2C are patterns used at the time of specifying the correspondence of x coordinates and X coordinates using gray codes. That is, in such an example, to specify the correspondence of x coordinates and X coordinates using gray codes, the pattern shown in FIG. 2A is created by considering a case where a value of the lowest bit is 0 as black and a case where the value is 1 as white when the X coordinate values are represented by gray codes. Similarly, the pattern shown in FIG. 2B is created by considering a case where a value of a bit (medium bit) higher than the lowest bit by 1 is 0 as black and a case where the value is 1 as white, and the pattern shown in FIG. 2C is created by considering a case where a value of the highest bit is 0 as black and a case where the value is 1 as white when the X coordinate values are represented by gray codes. That is, the pattern of the special texture shown in FIG. 2A is determined on the basis of the value of the lowest bit when the X coordinate value is represented by gray codes, and the patterns of the special textures shown in FIG. 2B and FIG. 2C are determined on the basis of the value of the medium bit and the highest bit when the X coordinate values are represented by gray codes. That is, in the examples shown in FIG. 2A to FIG. 2C, the patterns with the same number as a bit number 3 are formed, and the lowest bit, the medium bit, and the highest bit are associated in FIG. 2A, FIG. 2B, and FIG. 2C.

FIG. 2D is a diagram for explaining the creation of the patterns. As shown in FIG. 2D, a gray code representing the X coordinate value 1 is (000), in which the lowest bit is 0, the medium bit is 0, and the highest bit is 0. Accordingly, the brightness of the X coordinate value 1 of the special texture shown in FIG. 2A is black, the brightness of the X coordinate value 1 of the special texture shown in FIG. 2B is black, and the brightness of the X coordinate value 1 shown in FIG. 2C is black. Similarly, a gray code representing the X coordinate value 2 is (001), in which the lowest bit is 1, the medium bit is 0, and the highest bit is 0. Accordingly, the brightness of the X coordinate value 2 of the special texture shown in FIG. 2A is white, the brightness of the X coordinate value 2 of the special texture shown in FIG. 2B is black, and the brightness of the X coordinate value 2 of the special texture shown in FIG. 2C is black. The same processes are repeated up to the X coordinate values 3 to 8, thereby creating the patterns shown in FIG. 2A to FIG. 2C.

As described above, when the patterns of the plural kinds of special textures are determined by gray codes, it is possible to determine the value representing the X coordinate value of the original special texture by gray codes, by the brightness of the original special texture specified from the brightness values of each coordinate of the rendering-completed images created from the plural kinds of special textures. Herein, the brightness of the original special texture specified from the brightness value of each coordinate of the rendering-completed image can be specified, for example, by determining whether or not a value obtained by subtracting the bias B from the brightness value of the rendering-completed image is larger than ½ of the gain G. That is, when the original special texture is black, the value obtained by subtracting the bias B from the brightness value of the rendering-completed image becomes about 0. When the original special texture is white, the value obtained by subtracting the bias B from the brightness value of the rendering-completed image becomes substantially the same value as the gain G. Accordingly, when the value obtained by subtracting the bias B of each position from the brightness value of each position of the rendering-completed image is larger than ½ of the gain G of each position, it can be considered that the original special texture is white. When the value obtained by subtracting the bias B of each position from the brightness value of each position of the rendering-completed image is equal to or smaller than ½ of the gain G of each position, it can be considered that the original special texture is black.

The rendering-completed image is created by rendering the special texture created on the basis of the lowest bit value when the X coordinate value is represented by gray codes. In this case, when it is determined that the original special texture is white from the brightness value of each coordinate of the rendering-completed image, the lowest bit value of the X coordinate value represented by gray codes at the position is 1. When it is determined that the original special texture is black from the brightness value of each coordinate value of the rendering-completed image, the lowest bit value of X coordinate value represented by gray codes at the position is 0. The above-described processes are performed on each of the plural kinds of special textures, thereby determining the whole of the bits of the X coordinate value represented by gray codes corresponding to each position of the rendering-completed image. As a result, the correspondence of x coordinates and X coordinates can be defined.

For example, in the example shown in FIG. 2A, since the value obtained by subtracting the bias B (x, y) from the brightness value of the position $P_1$ (x, y) of the rendering-completed image $I_4$ is equal to or smaller than ½ of the gain G (x, y), it is determined that the original special texture is black. Accordingly, the lowest bit of the X coordinate value of the texture corresponding to the position $P_1$ (x, y) is 0. Similarly, in the example shown in FIG. 2B, since the value obtained by subtracting the bias B (x, y) from the brightness value of the position $P_1$ (x, y) of the rendering-completed image $I_5$ is equal to or smaller than ½ of the gain G (x, y), it is determined that the original special texture is black. Accordingly, the medium bit of the X coordinate value of the texture corresponding to the position $P_1$ (x, y) is 0. In the example shown in FIG. 2C, since the value obtained by subtracting the bias B (x, y) from the brightness value of the position $P_1$ (x,y) of the rendering-completed image $I_6$ is equal to or smaller than ½ of the gain G (x, y), it is determined that the original special texture is black. Accordingly, the highest bit of the X coordinate value of the texture corresponding to the position $P_1$ (x, y) is 0. Therefore, it is specified that the representation of gray codes of the X coordinate value corresponding to the position $P_1$ (x, y) is (000), and the X coordinate value is 1.

The processes described above are processes substantially equivalent to specifying the permutation of brightness of the original special texture on the basis of the brightness value in coordinates of the plural kinds of rendering-completed images, specifying the X coordinate value from the permutation, determining the X coordinate value corresponding to each coordinate of the rendering-completed image. In addition, the same processes are performed on the Y coordinate value, and thus it is possible to specify the Y coordinate value corresponding to each coordinate of the rendering-completed image. That is, when the same determination as the determination of the X coordinate value is performed by the special texture similar to the patterns shown in FIG. 2A to FIG. 2C turned 90 degrees, it is possible to specify the correspondence of the value obtained by representing the Y coordinate value by gray codes and y coordinates.

When the processes (A) to (C) are performed as described above, it is possible to specify the coordinates (X, Y) of the texture corresponding to arbitrary coordinates (x, y) of the rendering-completed image. In addition, it is possible to specify the influence which the rendering process has on brightness in arbitrary coordinates (x, y) of the rendering-completed image. Accordingly, when the information representing the correspondence of the coordinates specified by the processes and the influence which the rendering process has on brightness is stored, it is possible to perform the process of creating the rendering-completed image from arbitrary texture on the basis of the stored information with fewer resources at a high speed. Even when the position of the virtual 3-dimensional structure or lighting assumed in the rendering process is not clear, that is, even when only the image after the rendering process and the texture before the processes are clear, it is possible to reproduce the rendering process.

In the embodiment, compression is performed on the above-described configuration in an appropriate compression method, thereby compressing the volume of the image data at a very high compression rate. With such a configuration, the rendering image is efficiently managed. That is, in the rendering-completed image, different compression methods are applied to the texture area to which the texture is attached and the non-texture area to which the texture is not attached. A JPEG compression method is applied to the non-texture area, and the brightness value of the part where it does not have an influence on pixels of the non-texture area is adjusted such that a compression rate is very high.

Figure 3:
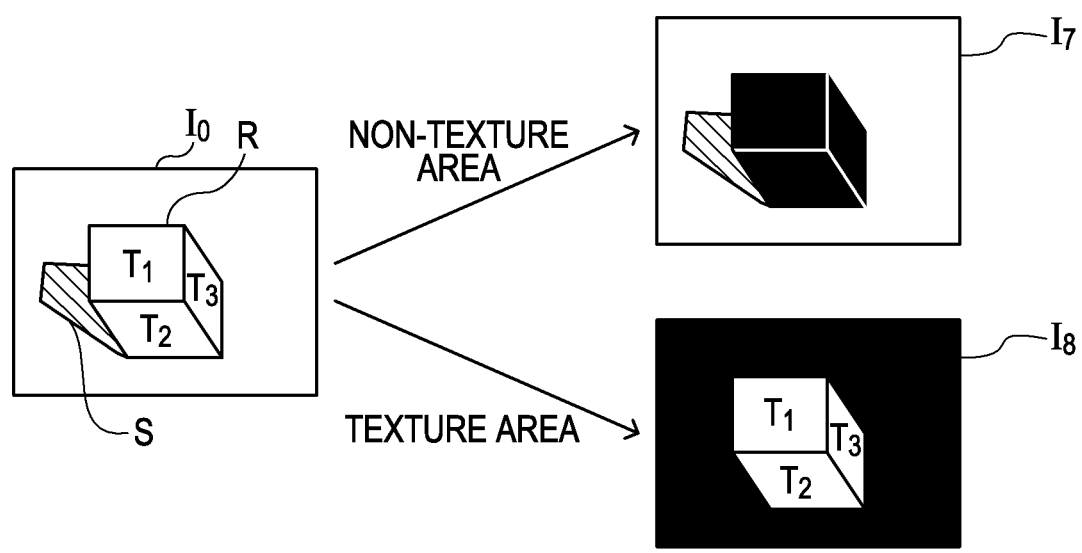
FIG. 3 is a diagram illustrating a non-texture area and a texture area.

FIG. 3 shows the non-texture area and the texture area in the rendering-completed image shown in FIG. 1A. In the example shown in FIG. 3, the non-texture area is formed of a part except for a rectangular parallelepiped R to which the textures $T_1$ to $T_6$ can be attached from the rendering-completed image. Meanwhile, the texture area is formed of a part constituting the image of the rectangular parallelepiped R to which the textures $T_1$ to $T_6$ can be attached in the rendering-completed image. In the non-texture area shown in FIG. 3, the texture area is represented by black solid, and a part other than the black solid is the non-texture area. Meanwhile, in the texture area shown in FIG. 3, the non-texture area is represented by black solid, and a part other than the black solid is the texture area.

In the embodiment, the non-texture area and the texture area are separately handled and the compression process is performed. Accordingly, the image formed by non-texture area and the image formed by the texture area are formed from the rendering-completed image. For example, in the example shown in FIG. 3, 2 images of the image $I_7$ formed by the non-texture area and the image $I_8$ formed by the texture area are formed, and they are compression targets. When the compressed image is developed and used, the rendering-completed image is formed by coupling the part other than the black solid of the image $I_7$ formed by the non-texture area and the part other than the black solid of the image $I_8$ formed by the texture area.

Accordingly, in the image $I_7$ formed by the non-texture area, only the part other than the black solid has a meaning, and the black solid part has no meaning (since the black solid part is pixels having no meaning, it is hereinafter referred to as blank pixels). For this reason, there is no problem even when the grayscale value in the blank pixels is set to an arbitrary value to handle the image $I_7$. In the embodiment, the grayscale value in the blank pixels is adjusted such that the JPEG compression is performed at a high compression rate. That is, in the embodiment, the grayscale value of the blank pixels is adjusted such that a result obtained by performing Huffman coding on a direct current component and an alternating current component obtained from the result of the discrete cosine transform performed in the course of the JPEG compression is a code which is as short as possible.

Specifically, in the JPEG compression method, the image of the compression target is divided into MCU (Minimum Coded Unit), the discrete cosine transform is performed on the grayscale value of each MCU, and a transformed image represented by the sum of the products of a coefficient depending on frequency and a basis function is created. In the transformed image, as for the coefficient of the direct current component with a frequency of 0, a difference from the coefficient of the direct current component in the MCU (generally, left side MCU) of the comparative target is subjected to Huffman coding. Accordingly, it is possible to compress the direct current component at high efficiency by as much as the difference from the MCU of the comparative target is small.

In the image transformed by the discrete cosine transform, as for the alternating current component with a frequency other than 0, a zigzag scanning is performed in a frequency plane after quantization, and the Huffman coding is performed again. In this case, with a configuration to gradually change the grayscale value of the pixels in the MCU, most of the high frequency components become 0 in the coefficient after quantization, and it is possible to efficiently perform the Huffman coding. Accordingly, when a sharp difference (edge, etc.) of the grayscale value in the MCU does not occur, it is possible to compress the alternating current component at high efficiency.

In the embodiment, the grayscale value of the blank pixels is set according to the distribution of the blank pixels in the MCU set to the image formed by the non-texture area. That is, when all of the pixels in the MCU are blank pixels, the grayscale value of all of the blank pixels in the MCU is an average value of the grayscale values in the MCU of the comparative target. With such a configuration, all of the coefficients of the alternating current component become 0, the difference from the direct current component in the MCU of the comparative target becomes 0 as for the coefficient of the direct current component, and thus it is possible to obtain a very short code by the Huffman coding.

Meanwhile, when a part of the pixels in the MCU are blank pixels, a process of making the grayscale value of the blank pixels in the MCU into an average value of the grayscale values of pixels around the blank pixels is sequentially performed on each of the blank pixels. With such a configuration, the grayscale value of the pixels in the MCU is gradually changed, and most of the high frequency components become 0 in the coefficient after the quantization. Accordingly, it is possible to efficiently perform the Huffman coding.

The above description is a schematic description of the embodiment of the invention, and detailed modification in design may be performed on the basis of the embodiment of the invention. For example, the pattern of the special texture is not limited to the above-described example. For example, black and white may be reversed, and may be another pattern. In the configuration of representing the colors of the pixels by the combination of the plurality of color components, a special texture may be created for each color component, and the rendering process may be performed thereon. In the processes (A) and (C), the determination may be performed on the basis of the sum of the color components, and in the process (B), the bias B and the gain G may be defined for each color component.

Figure 4:
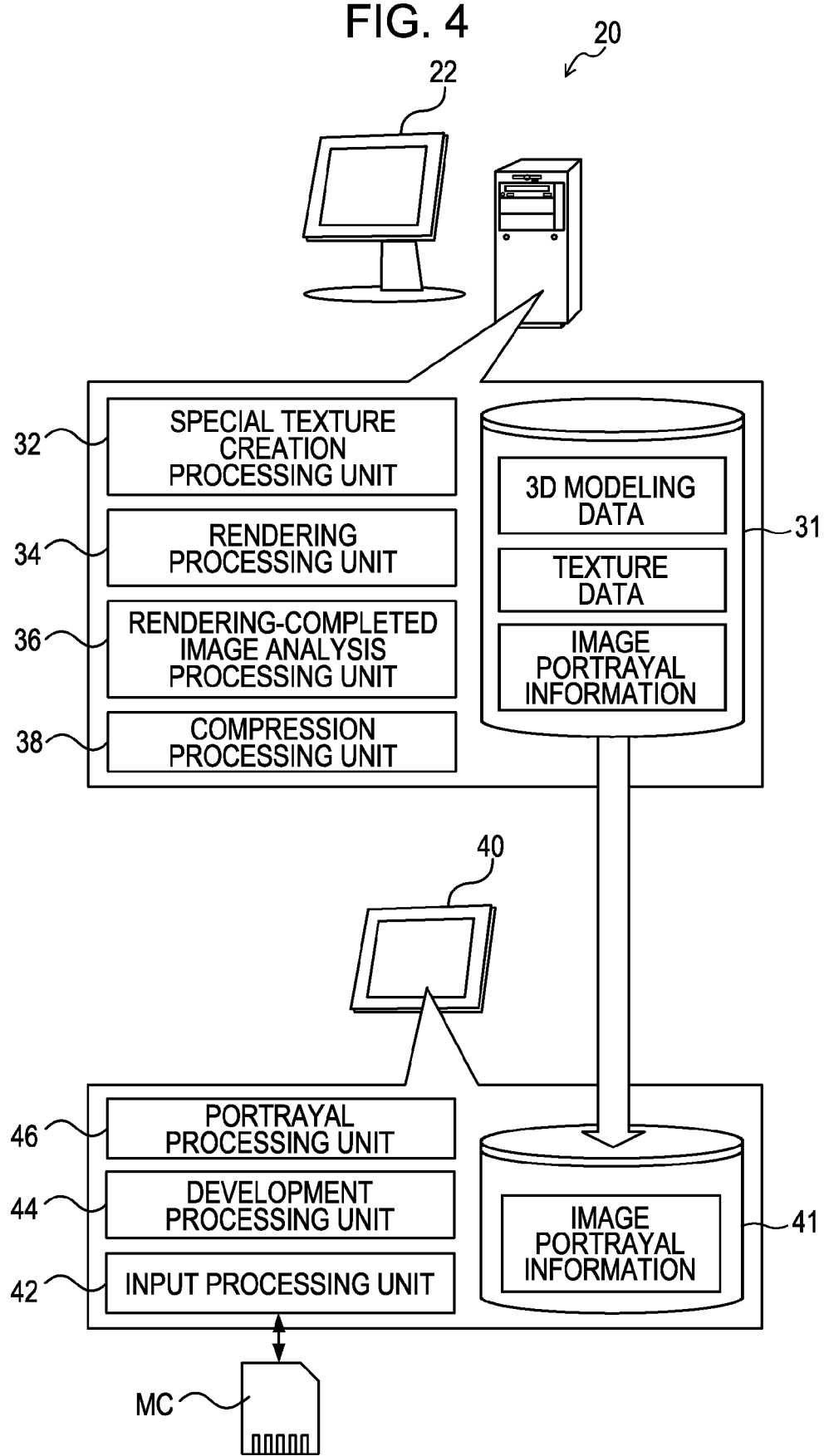
FIG. 4 is a schematic diagram illustrating a configuration of a computer 20 used in an image processing method.

Next, the embodiment of the invention will be described with detailed examples with reference to the drawings. FIG. 4 is a diagram illustrating a schematic configuration of a computer 20 and a viewer 40 used in the image processing method according to the embodiment of the invention. The computer 20 of the embodiment is formed of a general-purpose computer including a CPU that is a central processing unit, a ROM that stores a process program, a RAM that temporarily stores data, a graphic processor (GPU), a hard disk (HDD), a display 22, and the like, which is provided with, as functional blocks, a storage unit 31 that stores 3-dimensional modeling data (hereinafter, referred to as 3-dimensional model) representing a virtual 3-dimensional structure or the texture data (hereinafter, referred to as texture) attached thereto, a special texture creation processing unit 32 that creates a before-process special texture attached to the 3-dimensional model, a rendering processing unit 34 that creates a bitmap image by rendering the 3-dimensional model, a rendering-completed image analysis processing unit 36 that analyzes a rendering-completed image as the bitmap image obtained by rendering, and a compression processing unit 38 that compresses the created rendering-completed image or various kinds of data obtained by the analysis of the rendering-completed image analysis processing unit 36.

The special texture creation processing unit 32 is a processing unit that creates special textures attached to the 3-dimensional model subjected to the rendering by the rendering processing unit 34, and specifically, creates, in the grayscale range of values 0.0 to 1.0, a white solid pattern (second solid painting pattern) of a grayscale value 1.0, a black solid pattern (first solid painting pattern) of a grayscale value 0.0, a vertical stripe pattern (correspondence setting pattern) in which grayscale values of a value 0.0 and a value 1.0 are alternately represented in a transverse direction, and a horizontal stripe pattern (correspondence setting pattern) in which grayscale values of a value 0.0 and a value 1.0 are alternately represented in a longitudinal direction. Roles of the patterns will be described later.

The rendering processing unit 34 is a processing unit that functions by installing 3D rendering software in the computer 20, and reproduces a bitmap image by a frame unit at a predetermined frame rate (e.g., 30 times or 60 times per 1 second, etc.) by attaching the textures created by the special texture creation processing unit 32 to the 3-dimensional model to perform rendering, thereby displaying a moving image. In the embodiment, the rendering process is performed using a ray tracing method of performing rendering by calculating reflection of an object face or refraction of light while tracing light from a light source.

The rendering-completed image analysis processing unit 36 analyzes the bitmap image (rendering-completed image) created by the rendering processing unit 34, thereby creating image portrayal information so as to freely change desired image data such as a photograph instead of special textures and display the rendering-completed image on the viewer 40.

The compression processing unit 38 is a processing unit for compressing the image portrayal information created by the analysis of the rendering-completed image analysis processing unit 36. In the embodiment, plural kinds of compression methods are applied and perform compression to raise the whole compression rate while suppressing deterioration of image quality. Detailed compression methods will be described later.

The viewer 40 of the embodiment is provided with a storage unit 41 that stores the rendering-completed image obtained by the rendering processing unit 34 of the computer 20 and the image portrayal information analyzed by the rendering-completed image analysis processing unit 36 and compressed by the compression processing unit 38, an input processing unit 42 that inputs the image data such as a photograph stored in a memory card MC, a development processing unit 44 that decodes (develops) the image data input by the input processing unit 42, the rendering-completed image and image portrayal information stored in the storage unit 41, and a portrayal processing unit 46 that performs portrayal by synthesizing the image data input to the rendering-completed image as textures. The viewer 40 sequentially reads a plurality of image data stored in the memory card MC by an instruction from a user, attaches the read image data to the rendering-completed image of the 3-dimensional model using the image portrayal information to perform a slide show display of sequential reproduction.

Figure 5:
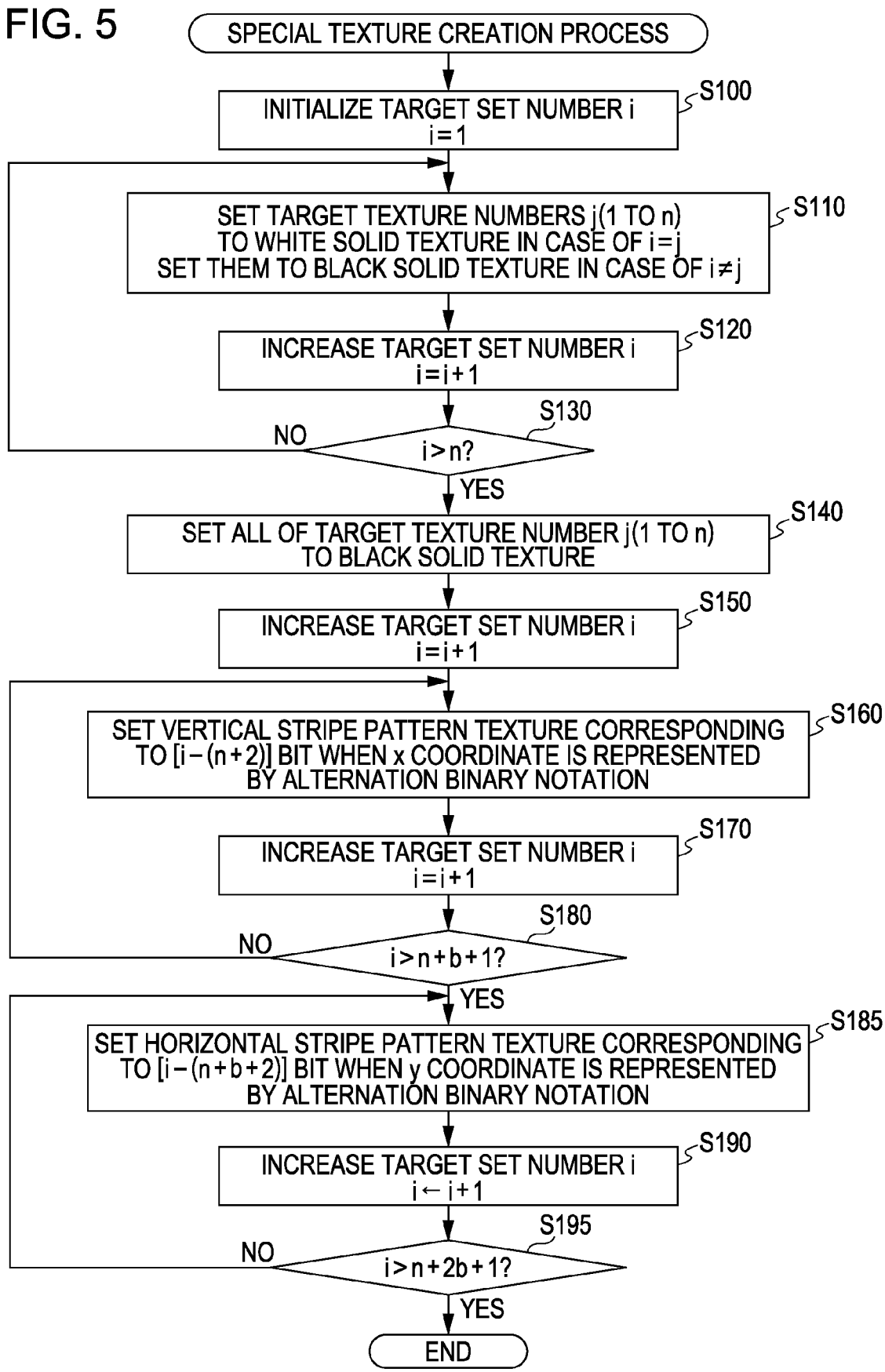
FIG. 5 is a flowchart illustrating an example of a special texture creation process.

Next, operations of the special texture creation processing unit 32, the rendering processing unit 34, the rendering-completed image analysis processing unit 36, and the compression processing unit 38 of the computer 20 configured as described above according to the embodiment, and operations of the development processing unit 44 and the portrayal processing unit 46 of the viewer 40 will be described. First, a process of the special texture creation processing unit 32 will be described. FIG. 5 is a flowchart illustrating an example of a special texture creation process.

In the special texture creation process, first, a target set number i for specifying any set of a plurality of sets is initialized into a value 1 (Step S100), n special textures are created for color components of RGB with respect to the target set number i (Step S110), the target set number i is increased by a value 1 (Step S120), and the target set number i is compared with a value n (Step S130). When the target set number i is equal to or smaller than the value n, the process returns to Step S110 and the process of creating n special textures is repeated with respect to the next target set number i. When the target set number i is larger than the value n, the process proceeds to the next process. As shown in the following formula (1), the creation of the special textures from a value 1 to a value n of the target set number i is performed in a manner that the target texture number j is compared with the target texture number i while shifting the target texture number j from 1 to n by a value 1, the grayscale value of a value 1.0 is set to the whole of the coordinates (X, Y) in the grayscale value range of a minimum value 0.0 (black) to a maximum value 1.0 (white) with respect to the target texture number j in the case where both coincide with each other, thereby creating a white solid special texture (second solid painting pattern), and the grayscale value of a value 0.0 is set to the whole of the coordinates (X, Y) with respect to the target texture number j in a case where both do not coincide with each other, thereby creating a black solid special texture (first solid painting pattern). "c" in the formula (1) denotes a value corresponding to each color of RGB values of the image data, "n" denotes the number of textures disposed on one screen, "b" denotes a bit number when representing coordinates of textures by binary numbers, and "$T_{c,i,j}(X, Y)$" denotes a grayscale value of coordinates (X, Y) of the special texture in a color component c, a target set number i, and a target texture number j (the same is applied hereinafter). Herein, as for all of the color components, a pattern in which a maximum value of the grayscale value is set to the whole of the coordinates is called white solid, and a pattern in which a minimum value of the grayscale value is set to the grayscale value is set to the whole of the coordinates is called black solid (the same is applied hereinafter).

Formula 1

When $i=j$, $T_{c,i,j}(X,Y)=1.0$

When $i \neq j$, $T_{c,i,j}(X,Y)=0.0$ (1)

c=1 to 3, j=1 to n, X=1 to $2^b$, Y=1 to $2^b$

When the special texture in which the target set number i is a value 1 to a value n (first set group consisting of n sets) is created, n special textures for each color component in which the target set number i is a value (n+1) are created (Step S140) (second set), and the target set number i is increased by a value 1 (Step S150). As shown in the following formula (2), the creation of the special texture in which the target set number i is the value (n+1) is performed in a manner that a grayscale value of a value 0.0 is set to the whole of the coordinates (X, Y) with respect to all of the target texture numbers j from 1 to n, thereby creating a black solid special texture.

Formula 2

$T_{c,n+1,j}(X,Y)=0.0$ (2)

c=1 to 3, j=1 to n, X=1 to $2^b$, Y=1 to $2^b$

When the special texture in which the target set number i is a value (n+1) is created, n special textures for each vertical stripe color component corresponding to $[i-(n+2)]^{th}$ bit when coordinates of the texture are represented by reflected binary number (gray code) with respect to the target set number i are created by the following formula (3) (Step S160), the target set number i is increased by a value 1 (Step S170), and the target set number i is compared with the value (n+b+1) (Step S180). When the target set number i is equal to or smaller than the value (n+b+1), the process returns to Step S160 and the process of creating n special textures with respect to the next target set number i is repeated. When the target set number i is larger than the value (n+b+1), the process proceeds to the next process. By the above-described processes, a correspondence setting pattern for setting correspondence of x coordinates of the rendering-completed image and X coordinates of the special texture is created. In the formula (3), "gray(a)" is gray code (alternating binary code) expression of a value a, and "and(a,b)" denotes a logical product of a and b for each bit (the same is applied hereinafter). The target set number i from (n+2) to (n+b+1) corresponds to each bit from $(b-1)^{th}$ bit (lowest bit) to $0^{th}$ bit (highest bit) when coordinates of each texture are represented by binary numbers. When the value of the bit corresponding to the target set number i is 1, a grayscale value of a value 1.0 (white) is set. When the value of the corresponding bit is 0, a grayscale value of a value 0.0 (black) is set. Accordingly, a vertical stripe special texture is created. In the embodiment, the coordinates of the texture are represented by binary numbers. For example, when the texture number n is 3 and the coordinates are 3 bits (b=3) of values 1 to 8, as the special texture of a value 5 when the target set number i represents the second bit (lowest bit), a black grayscale value is set for the X coordinate value 1, a white grayscale value is set for the X coordinate values 2 and 3, a black grayscale value is set for the X coordinate values 4 and 5, a white grayscale value is set for the X coordinate values 6 and 7, and a black grayscale value is set for the X coordinate value 8. As the special texture of a value 6 when the target set number i represents the first bit, a black grayscale value is set for the X coordinate values 1 and 2, a white grayscale value is set for the X coordinate values 3 to 6, and a black grayscale value is set for the X coordinate values 7 and 8. As the special texture of a value 7 when the target set number i represents the $0^{th}$ bit (highest bit), a black grayscale value is set for the X coordinate values 1 to 4, and a white grayscale value is set for the X coordinate values 5 to 8.

Formula 3

$$\text{When and}(\text{gray}(X-1), 2^{i-(n+2)}) \neq 0, \ T_{c,i,j}(X,Y)=1.0$$

$$\text{When and}(\text{gray}(X-1), 2^{i-(n+2)})=0, \ T_{c,i,j}(X,Y)=0.0 \quad (3)$$

c=1 to 3, i=n+2 to n+b+1, j=1 to n, X=1 to $2^b$, Y=1 to $2^b$

Figure 6:
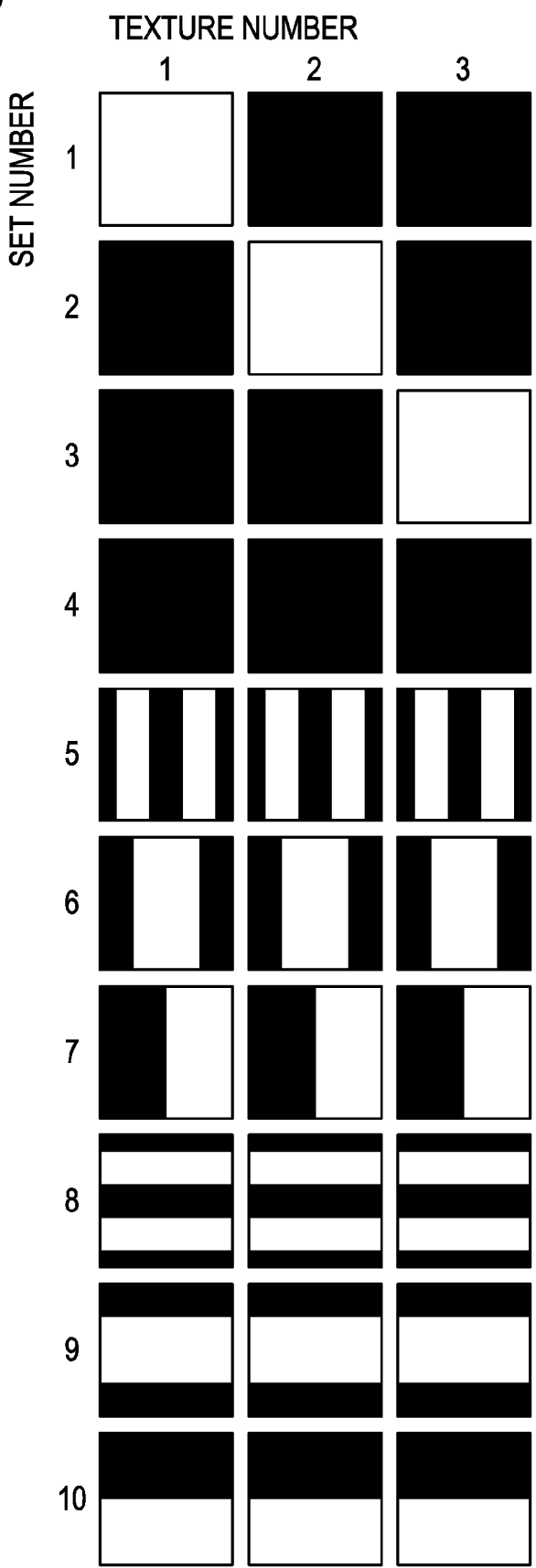
FIG. 6 is a diagram illustrating an example of special textures.

When the special texture in which the target set number i is a value (n+2) to a value (n+b+1) is created, n special textures for each horizontal stripe color component corresponding to $[i-(n+b+2)]^{th}$ bit when y coordinates of the texture are represented by reflected binary number (gray code) with respect to the target set number i are created by the following formula (4) (Step S185), the target set number i is increased by a value 1 (Step S190), and the target set number i is compared with the value (n+2b+1) (Step S195). When the target set number i is equal to or smaller than the value (n+2b+1), the process returns to Step S185 and the process of creating n special textures with respect to the next target set number i is repeated. When the target set number i is larger than the value (n+2b+1), it is considered that the creation of all of the special textures are completed, and the present routine is ended. By the above-described processes, a correspondence setting pattern for setting correspondence of y coordinates of the rendering-completed image and Y coordinates of the special texture is created. The target set number i from (n+b+2) to (n+2b+1) corresponds to each bit from $(b-1)^{th}$ bit (lowest bit) to $0^{th}$ bit (highest bit) when coordinates of each texture are represented by binary numbers. When the value of the bit corresponding to the target set number i is 1, a grayscale value of a value 1.0 (white) is set. When the value of the corresponding bit is 0, a grayscale value of a value 0.0 (black) is set. Accordingly, a horizontal stripe special texture is created. In the embodiment, the coordinates of the texture are represented by binary numbers. For example, when the texture number n is 3 and the y coordinates are 3 bits (b=3) of values 1 to 8, as the special texture of a value 8 when the target set number i represents the second bit (lowest bit), a black grayscale value is set for the Y coordinate value 1, a white grayscale value is set for the Y coordinate values 2 and 3, a black grayscale value is set for the Y coordinate values 4 and 5, a white grayscale value is set for the Y coordinate values 6 and 7, and a black grayscale value is set for the Y coordinate value 8. As the special texture of a value 9 when the target set number i represents the first bit, a black grayscale value is set for the Y coordinate values 1 and 2, a white grayscale value is set for the Y coordinate values 3 to 6, and a black grayscale value is set for the Y coordinate values 7 and 8. As the special texture of a value 10 when the target set number i represents the $0^{th}$ bit (highest bit), a black grayscale value is set for the Y coordinate values 1 to 4, and a white grayscale value is set for the Y coordinate values 5 to 8. FIG. 6 shows a list of special textures created when the texture number n is a value 3 and the bit number b is a value 3.

Formula 4

$$\text{When and}(\text{gray}(Y-1), 2^{i-(n+b+2)}) \neq 0, \ T_{c,i,j}(X,Y)=1.0$$

$$\text{When and}(\text{gray}(Y-1), 2^{i-(n+b+2)})=0, \ T_{c,i,j}(X,Y)=0.0 \quad (4)$$

c=1 to 3, i=n+2 to n+2b+1, j=1 to n, X=1 to $2^b$, Y=1 to $2^b$

Figure 7:
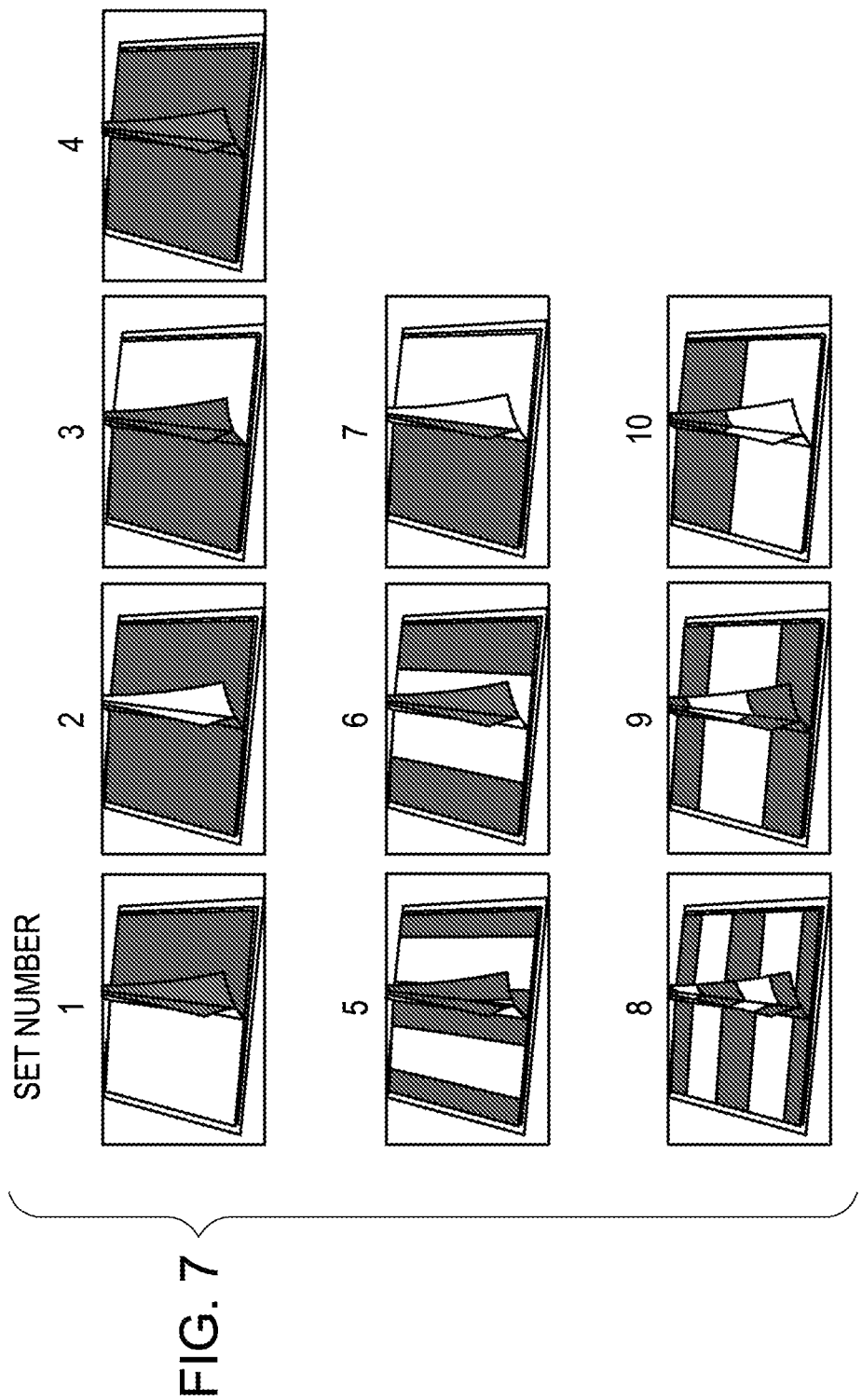
FIG. 7 is a diagram illustrating an aspect of rendering a special texture for each set.

The rendering processing unit 34 performs a rendering process by attaching the n corresponding special textures to the 3-dimensional model, for each set. FIG. 7 shows the rendering process. In the embodiment, the 3-dimensional model is rendered as a moving image, the texture number n is the value 3, and the bit number b is the value 3. Accordingly, a total of 10 sets of the rendering process are performed, and 10 sets of moving image are created. The moving image is configured by a bitmap image (rendering-completed image) created for each frame of frames 1 to T. In FIG. 7, the bitmap image of the common frame number is extracted and shown from each of 10 sets of rendering-completed images.

Figure 8:
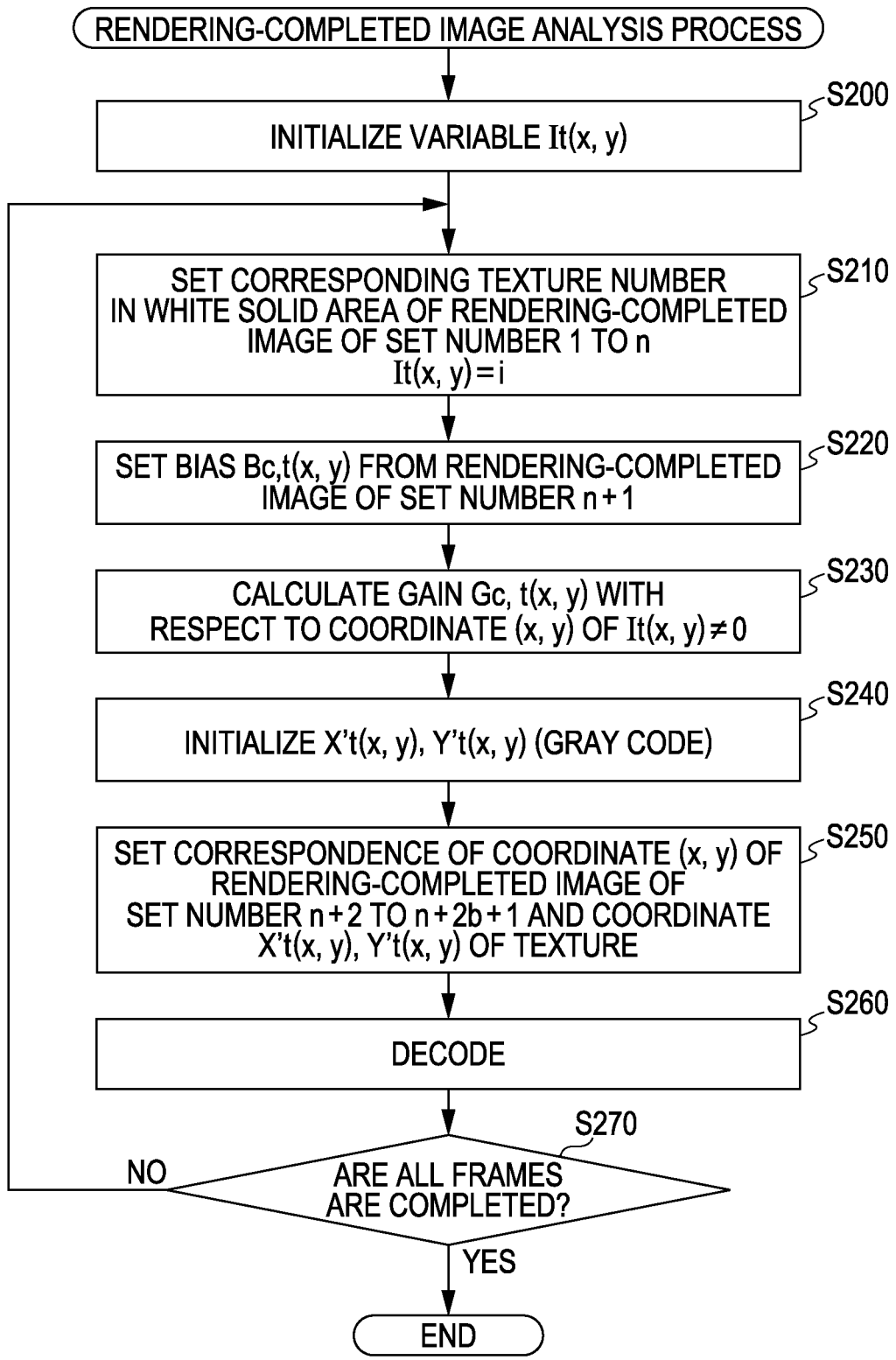
FIG. 8 is a flowchart illustrating an example of a rendering-completed image analysis process.

Next, a process of analyzing the rendering-completed image created by the rendering processing unit 34 will be described. FIG. 8 is a flowchart illustrating an example of the rendering-completed image analysis process performed by the rendering-completed image analysis processing unit 36.

In the rendering-completed image analysis process, first, as shown in the following formula (5), a variable It (x, y) representing the texture number attached to the coordinates (x, y) of the rendering-completed image in each frame number t (=1 to T) is initialized into a value 0 (Step S200), a white solid area (coordinates) of the rendering-completed image of the set numbers 1 to n in the target frame t is specified, and a texture number corresponding to the variable It (x, y) of the white solid area is set (Step S210). As shown in the following formula (6), this process may be performed by comparing the grayscale value (sum of grayscale values of color components) of the rendering-completed image of the target set number with the grayscale value (sum of grayscale values of color components) of the rendering-completed image of the set number (n+1) while sequentially shifting the target set number i from 1 to n. That is, in the target set number i, the special texture of the same texture number as the number i is set to white solid. In the set number (n+1), the special texture of the whole of the texture numbers is set to black solid. Accordingly, when the grayscale value of the rendering-completed image of the target set number i is larger than the grayscale value of the rendering-completed image of the set number (n+1), it can be known that the special texture of the texture number i is attached to the coordinates (x, y). In the following formula (5), "w" denotes a width size of a rendering-completed image, and "h" denotes a height size of a rendering-completed image. In the following formula (6), "Ac,i,t (x,y)" denotes a grayscale value of coordinates (x, y) of the rendering-completed image in a color component c, a set number i (1 to n), and a frame number t (the same is applied hereinafter).

Formula 5

$$I_t(x, y) = 0 \quad (5)$$
$$i = 1 \text{ to } n, x = 1 \text{ to } w, y = 1 \text{ to } h$$

$$\text{When } \sum_{c=0}^{2} A_{c,n+1,t}(x, y) < \sum_{c=0}^{2} A_{c,i,t}(x, y), I_t(x, y) = i \quad (6)$$
$$i = 1 \text{ to } n, t = 1 \text{ to } T, x = 1 \text{ to } w, y = 1 \text{ to } h$$

Figure 9:
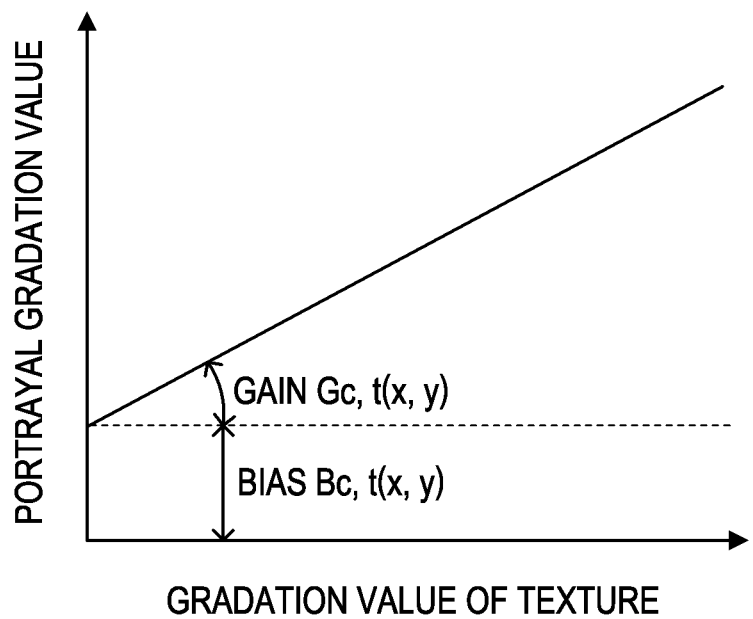
FIG. 9 is a diagram illustrating a bias $B_{c,t}(x, y)$ and a gain $G_{c,t}(x, y)$.

Subsequently, the grayscale value of the rendering-completed image of the set number (n+1) is set as the bias Bc,t (x, y) by the following formula (7) (Step S220), and the gain Gc,t (x, y) is calculated for the coordinates (x, y) of the rendering-completed image in which the variable It (x, y) is not a value 0, that is, the area to which the texture is attached, by the following formula (8) (Step S230). In the formula (8), "Ac, It (x, y), t (x, y)" denotes a grayscale value of the coordinates (x, y) of the rendering-completed image in a color component c, a set number i stored in a variable It (x, y), and a frame number t. FIG. 9 shows relationship between the bias Bc,t (x, y) and the gain Gc,t (x, y). When the rendering is performed by attaching the textures to the 3-dimensional model, an offset which does not depend on the grayscale value of the original texture corresponds to the bias Bc,t (x, y), and a slope in variation of the grayscale value of the rendering-completed image with respect to the grayscale value of the original texture corresponds to the gain Gc,t (x, y).

Formula 6

$$B_{c,t}(x,y) = A_{c,n+1,t}(x,y) \quad (7)$$

$$\text{when } I_t(x,y) \neq 0, \; G_{c,t}(x,y) = A_{c,It(x,y),t}(x,y) - B_{c,t}(x,y)$$

$$\text{when } I_t(x,y) = 0, \; G_{c,t}(x,y) = 0 \quad (8)$$

c=1 to 3, t=1 to T, x=1 to w, y=1 to h

The coordinates (X't(x, y), Y't(x, y)) of the texture represented by gray codes is initialized into a value 0 by the following formula (9) (Step S240), and the correspondence of the coordinates (x, y) of the rendering-completed image of the set number (n+2) to (n+2b+1) and the coordinates (X't(x, y), Y't(x, y)) of the texture is set (Step S250). The correspondence of the coordinates is set by the following formula (10). Specifically, while sequentially shifting the number i from 1 to b, it is determined whether or not a value (sum of color components) obtained by subtracting the bias Bc,t (x, y) from the grayscale value Ac,i+n+1,t (x, y) of the rendering-completed image of the set number (i+n+1) is larger than a value (sum of color components) obtained by dividing the gain Gc,t (x,y) of the rendering-completed image of the set number i by 2, that is, whether or not the coordinates (x, y) of the vertical stripe pattern of white and black in the set number (i+n+1) are white. When they are white, the value of the corresponding $(i-1)^{th}$ bit of the coordinates X't (x, y) represented by reflected binary number is set to a value 1. While sequentially shifting the number i from 1 to b, it is determined whether or not a value (sum of color components) obtained by subtracting the bias Bc,t (x, y) from the grayscale value Ac,i+b+n+1,i (x, y) of the rendering-completed image of the set number (i+b+n+1) is larger than a value (sum of color components) obtained by dividing the gain Gc,t (x,y) of the rendering-completed image of the set number i by 2, that is, whether or not the coordinates (x, y) of the horizontal stripe patterns of white and black in the set number (i+b+n+1) are white. When they are white, the value of the corresponding $(i-1)^{th}$ bit of the coordinates Y't (x, y) is set to a value 1. In the formula (10), "or(a,b)" denotes a logical sum of a and b for each bit.

Formula 7

$$X'_t(x, y) = 0 \quad (9)$$
$$Y'_t(x, y) = 0$$
$$t = 1 \text{ to } T, x = 1 \text{ to } w, y = 1 \text{ to } h$$

When $\quad (10)$ $$\frac{\sum_{c=0}^{2} G_{c,t}(x, y)}{2} < \sum_{c=0}^{2} A_{c,i+n+1,t}(x, y) - \sum_{c=0}^{2} B_{c,t}(x, y),$$

$$X'_t(x, y) = \text{or} \left( X'_t(x, y), 2^{i-1} \right)$$

When $$\frac{\sum_{c=0}^{2} G_{c,t}(x, y)}{2} < \sum_{c=0}^{2} A_{c,i+b+n+1,t}(x, y) - \sum_{c=0}^{2} B_{c,t}(x, y),$$

$$Y'_t(x, y) = \text{or} \left( Y'_t(x, y), 2^{i-1} \right)$$
$$i = 1 \text{ to } b, t = 1 \text{ to } T, x = 1 \text{ to } w, y = 1 \text{ to } h$$

When the correspondence of the coordinates is set, the coordinates (X't(x, y), Y't(x, y)) of the texture represented by gray codes are decoded using the following formula (11), coordinates (Xt(x, y), Yt(x, y)) after the decoding are calculated (Step S260), it is determined whether or not the process is completed for the whole of the frames from a value 1 to a value T (Step S270). When the process is not completed for the whole of the frames, the next frame is set to a target frame t, the process returns to Step S210, and the process is repeated. When the process is completed for the whole of the frames, the present process is ended. In the formula (11), "gray$^{-1}$(a)" denotes a value obtained by decoding a gray code a, "Xt(x, y)" denotes x coordinates of the texture corresponding to the coordinates (x, y) of the rendering-completed image of the frame number t, and "Yt(x, y)" denotes y coordinates of the texture corresponding to the coordinates (x, y) of the rendering-completed image of the frame number t. In the embodiment, since the origin of the coordinates (X't(x, y), Y't(x, y)) is (1, 1), a value 1 is added to the value obtained by decoding the gray code. The image portrayal information includes the variable It (x, y), the bias Bc,t (x, y), the gain Gc,t (x, y), and the coordinates (Xt(x, y), Yt(x, y)).

Formula 8

$$X_t(x,y) = \text{gray}^{-1}(X't(x,y)) + 1$$

$$Y_t(x,y) = \text{gray}^{-1}(Y't(x,y)) + 1 \quad (11)$$

t=1 to T, x=1 to w, y=1 to h

Figure 10:
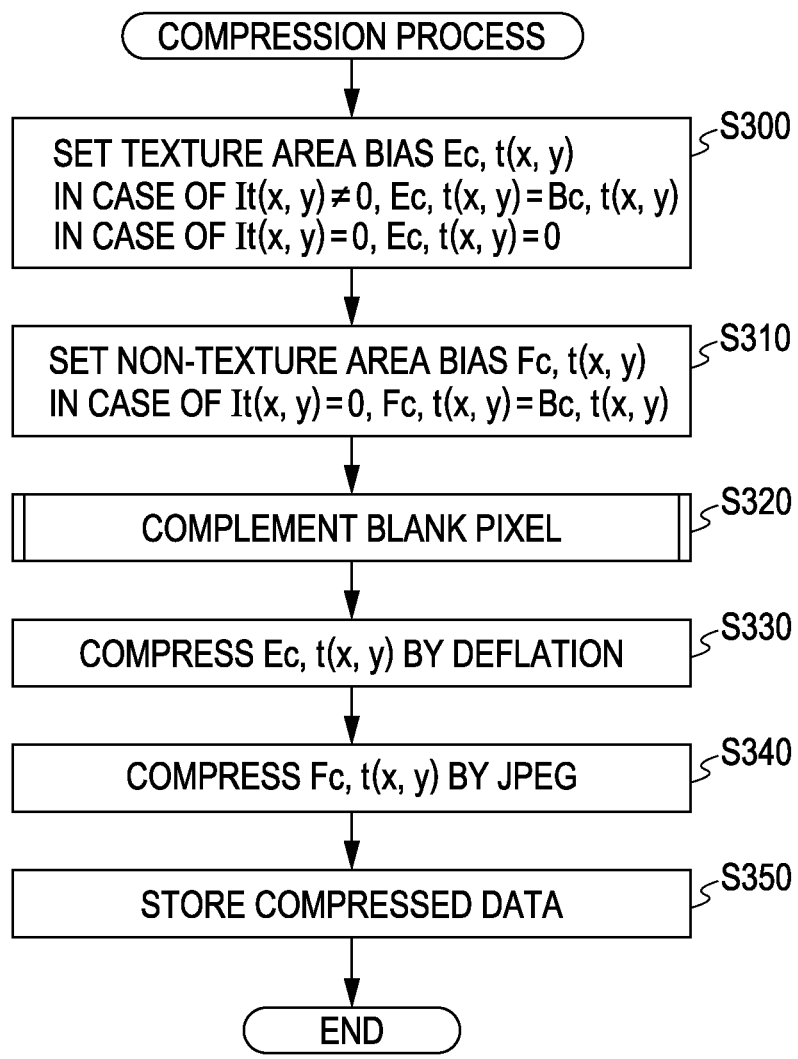
FIG. 10 is a flowchart illustrating an example of a compression process.

Next, a process of compressing the image portrayal information obtained by the analysis of the rendering-completed image analysis processing unit 36, and particularly, a process of compressing the bias Bc,t (x, y) will be described. FIG. 10 is a flowchart illustrating the compression process performed by the compression processing unit 38.

In the compression process, the texture area and the non-texture area are separated, the image portrayal information of each area is represented by the x and y coordinate system, and the compression process is separately performed. For this reason, first, the texture area of the bias Bc,t (x, y) of the whole area is extracted, and the texture area bias Ec,t (x, y) is set (Step S300). This process is performed by setting the bias Bc,t (x, y) to the texture area bias Ec,t (x, y) with respect to the coordinates (x, y) in which the variable It (x, y) is not a value 0, and setting a value 0 to the texture area bias Ec,t (x, y) with respect to the coordinates (x, y) in which the variable It (x, y) is a value 0. Subsequently, the bias Bc,t (x, y) of the non-texture area is extracted, the non-texture area bias Fc,t (x, y) is set (Step S310), and blank pixels in the texture area of the set non-texture area bias Fc,t (x, y) are interpolated (Step S320). That is, since the bias Fc,t (x, y) for the non-texture area is not defined for an area (area corresponding to the texture area) other than the non-texture area, the blank pixels are interpolated considering the area other than the non-texture area as blank pixels. As for the texture area bias Ec,t (x, y), deflate compression that is one of the lossless compression methods is performed (Step S330). As for the non-texture area, JPEG compression is performed (Step S340), the compressed data is stored (Step S350), and the present process is ended. In the embodiment, as also for It (x, y), Gc,t (x, y), Xt (x, y), and Yt (x, y) as the image portrayal information, the compression is performed by lossless compression such as deflate compression.

Figure 11:
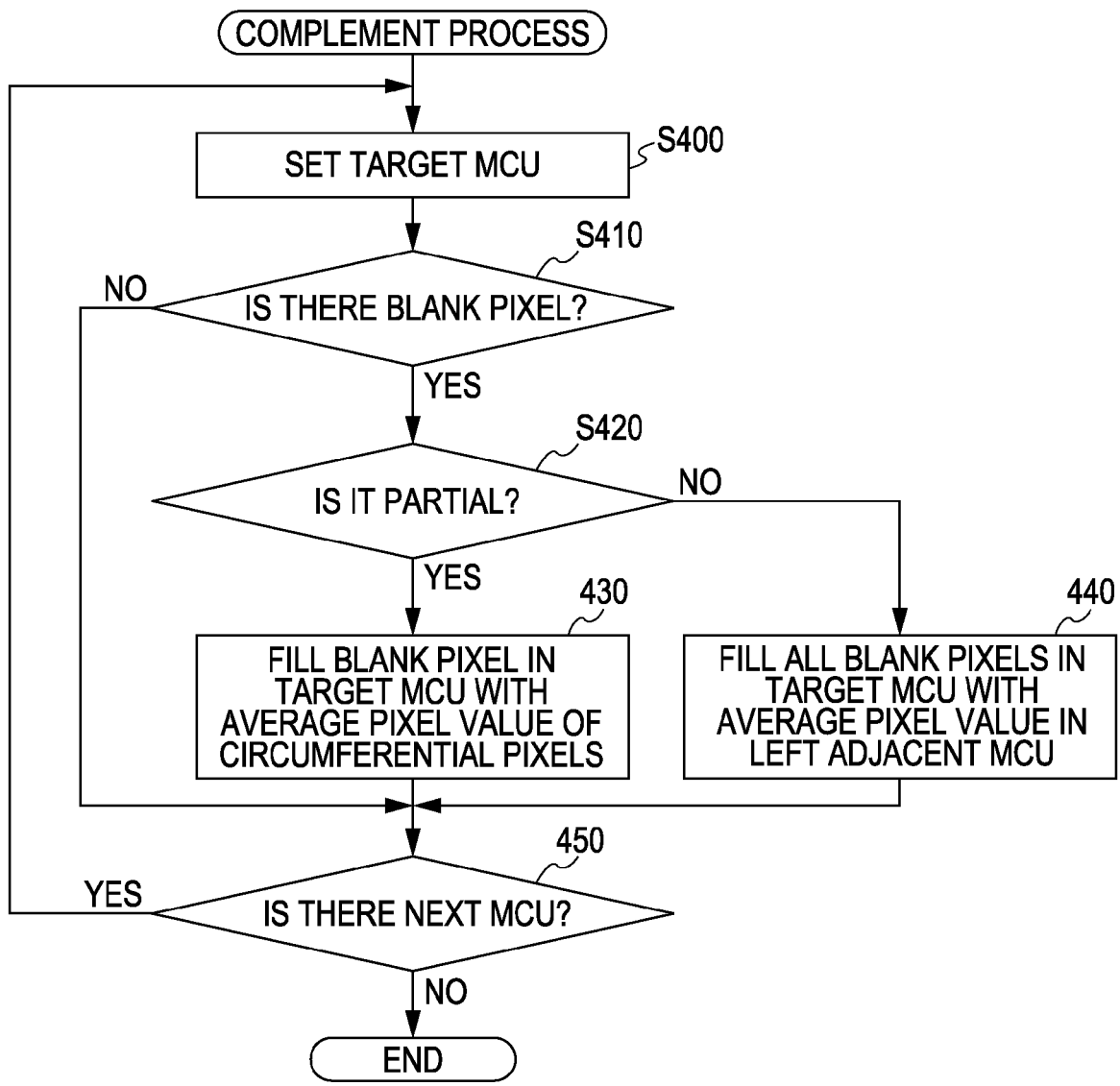
FIG. 11 is a flowchart illustrating an example of a interpolating process.
Figure 12:
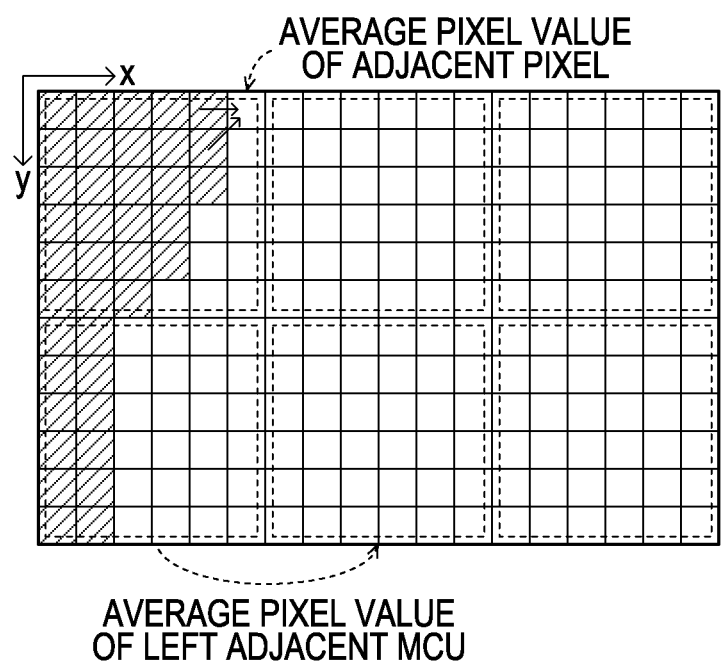
FIG. 12 is a diagram illustrating an aspect of a interpolation of blank pixels.

FIG. 11 is a flowchart illustrating an example of a interpolating process of interpolating blank pixels by Step S320 shown in FIG. 10. In the interpolating process, first, a target MCU as a process target of MCU (Minimum Coded Unit) that is a basic unit of the JPEG process is set (Step S400). For example, in a coordinate system in which the x coordinate value is increased from left to right and the y coordinate value is increased from upside to downside, the leftmost and uppermost MCU is set to the target MCU for the first time. Then, while the immediate right MCU is set to the target MCU, the leftmost MCU located down by one line is set to the target MCU when reaching the rightmost side, and then the same is applied later. Next, it is determined whether or not there is a blank pixel in the set target MCU (Step S410). When there is no blank pixel in the target MCU, the interpolation of the blank pixel is not necessary. Accordingly, it is determined whether or not there is the next MCU (Step S450). When there is the next MCU, the process returns to Step S400 and the process of setting the MCU to the target MCU is repeated. Meanwhile, when there is a blank pixel in the target MCU, it is determined whether or not a part in the target MCU is blank pixels (Step S420). When a part in the target MCU is a blank pixel, a process of filling the blank pixel with an average grayscale value of adjacent pixels is performed (Step S430). When all in the target MCU are blank pixels, a process of filling the blank pixels with an average grayscale value of the left adjacent MCU is performed (Step S440), and the process proceeds to the next process. When there is not the left adjacent MCU and the target MCU is located at the leftmost and uppermost part, a process of filling the blank pixels with a grayscale value 0 is performed. When the target MCU is located in the second line or lower, a process of filling the blank pixel with an average grayscale value of the rightmost MCU located up by one line is performed. In Step S450, when it is determined that there is the next MCU, the process returns to Step S400 and the process of setting the next MCU to the target MCU is repeated. When there is not the next MCU, the present process is ended. FIG. 12 shows the interpolation of the blank pixels. In this process, the grayscale value is gradually changed in the vicinity of the boundary between the texture area and the non-texture area, and the part far away from the boundary is filled with the average grayscale value of the MCU in the vicinity of the boundary. With such a configuration, it is possible to raise the compression efficiency of the JPEG compression by performing the JPEG compression on the non-texture area bias Fc,t (x, y) in which the blank pixels are interpolated.

Figure 13:
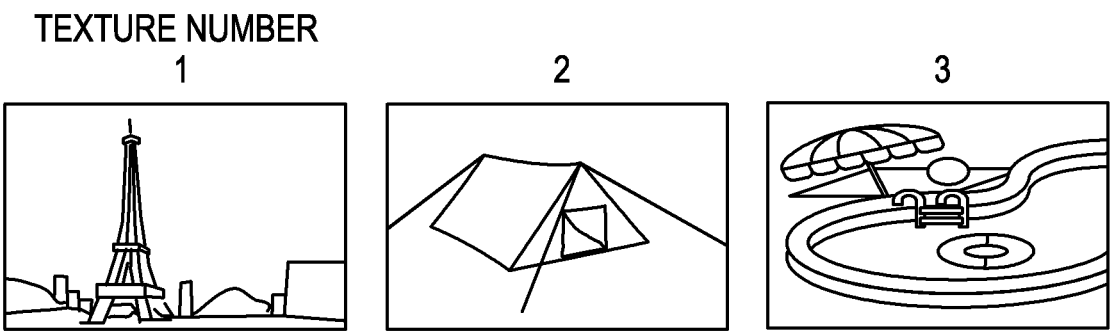
FIG. 13 is a diagram illustrating three replacing textures.
Figure 14:
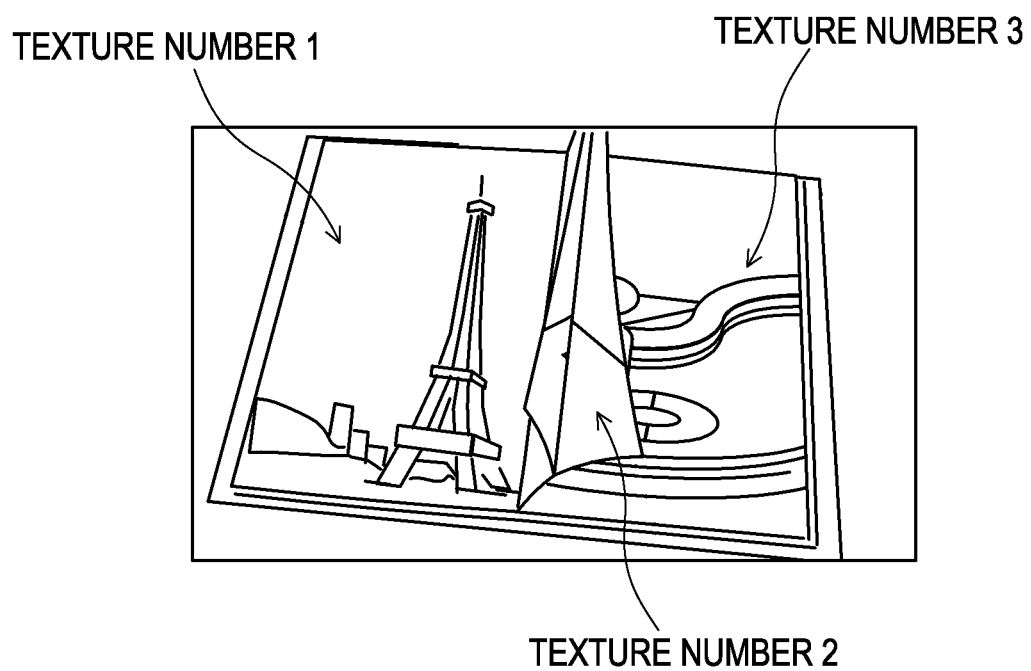
FIG. 14 is a diagram illustrating an example of a slide show display of the replacing textures.

The image portrayal information (the variable It (x, y), the bias Ec,t (x, y) and Fc,t (x, y), the gain Gc,t (x, y), and the coordinates (Xt(x, y), Yt(x, y))) compressed by the compression processing unit 38 of the computer 20 is stored in the storage unit 41 of the viewer 40, the development processing unit 44 of the viewer 40 develops the variable It (x, y), the bias Ec,t (x, y), the gain Gc,t (x, y), and the coordinates (Xt(x, y), Yt(x, y)), which are subjected to deflate compression, by a deflate decompression process, and develops the bias Fc,t (x, y), which is subjected to JPEG compression, by a JPEG decompression process, and they are used in the portrayal process performed by the portrayal processing unit 46. In the portrayal processing unit 46, the plurality of image data such as photographs stored in the memory card MC are read as replacing textures, and are synthesized with the rendering-completed images using the following formula (12) to sequentially portray them, and thus it is possible to reproduce a slide show for displaying the rendering-completed image of the 3-dimensional model while replacing the textures. In the formula (12), "Uc,It(x, y)(Xt(x, y), Yt(x, y))" denotes a grayscale value (0.0 to 1.0) of the coordinates (X, Y) of the replacing texture in a color component c and a texture number i, and "Pc,t (x, y)" denotes a grayscale value (0.0 to 0.1) of the coordinates (x, y) of the displayed image (rendering-completed image) in a color component c and a frame number t. As shown in the formula (12), the grayscale value Pc,t (x, y) of the displayed image is set in a manner that, as for the texture-disposed area in which the variable It (x, y) is not a value 0, the grayscale value of the coordinates (Xt(x, y), Yt(x, y)) of the replacing texture corresponding to the coordinates (x, y) of the displayed image is multiplied by the gain Gc,t (x, y), the obtained value is added to the bias Ec,t (x, y), the obtained value is set, and as for the area other than the texture-disposed area in which the variable It (x, y) is a value 0, the bias Fc,t (x, y) is set. FIG. 13 shows three replacing textures, the texture numbers of which are 1 to 3, and FIG. 14 shows portrayal by disposing the replacing textures shown in FIG. 13 to the rendering-completed images.

Formula 9

When $I_t(x,y) \neq 0$, $$P_{c,t}(x,y) = E_{c,t}(x,y) + G_{c,t}(x,y) U_{c,It(x,y)}(X_t(x,y), Y_t(x,y))$$

When $I_t(x,y) = 0$, $$P_{c,t}(x,y) = F_{c,t}(x,y) \quad (12)$$

c=1 to 3, t=1 to T, x=1 to w, y=1 to h

According to the image processing method of the embodiment, the rendering is performed by attaching the special texture to the 3-dimensional model, the texture area is extracted for the bias Bc,t (x, y) as one of the image portrayal information obtained by analyzing the rendering-completed image, the texture area bias Ec,t (x, y) is set, the blank pixels are interpolated such that the grayscale value is gradually changed in the vicinity of the boundary of the area, the non-texture area bias Fc,t (x, y) is set, the texture area bias Ec,t (x, y) is compressed by the deflate compression process, the non-texture area bias Fc,t (x, y) is compressed by JPEG compression, and thus it is possible to compress the data at a high compression rate while suppressing deterioration of the whole quality. In the computer 20, the rendering is performed by attaching the vertical stripe pattern for x coordinates and the horizontal stripe pattern for y coordinates corresponding to each bit when the coordinates (X, Y) are represented by binary numbers as the special texture to the 3-dimensional model, the rendering-completed image obtained as the bitmap image by the rendering is analyzed to set the correspondence of the coordinates (x, y) of the rendering-completed image and the coordinates (Xt(x, y), Yt(x, y)) of the texture, and it is stored as the image portrayal information. In the viewer 40, when the image is displayed using the rendering-completed image, the portrayal is performed to the coordinates (x, y) of the displayed image on the basis of the grayscale value of the coordinates (Xt(x, y), Yt(x, y)) of the texture by the image portrayal information stored in advance. Accordingly, it is possible to reproduce the rendering-completed image of the 3-dimensional model while freely changing the textures, and it is possible to reduce the process burden as compared with the case of rendering and displaying the 3-dimensional model in real time. Since the grayscale value of the displayed image is set by transforming the grayscale value of the texture using the gain $G_{c,t}(x, y)$ or the bias $B_{c,t}(x, y)$, it is possible to reflect the influence such as refracted light, mirror reflection, and shadow when the rendering is performed on the 3-dimensional model. Since the vertical stripe pattern and the horizontal stripe pattern corresponding to the reflected binary number are formed as the special textures for specifying the correspondence of the coordinates, the transfer to the adjacent coordinates always becomes 1-bit change, and thus it is possible to prevent erroneous data caused by error of the grayscale value of the image from being acquired.

In the embodiment, as the interpolating process, when a part in the target MCU is a blank pixel, the blank pixel is filled with the average grayscale value of the adjacent pixels, and when all parts in the target MCU are blank pixels, the blank pixels are filled with the average grayscale value of the left adjacent MCU. However, the invention is not limited thereto, and the interpolation may be performed such that the grayscale value is gradually changed in the vicinity of the area boundary. Accordingly, for example, merely, the blank pixel may be sequentially filled with the average grayscale value of the adjacent pixels.

In the embodiment, the texture area bias $E_{c,t}(x, y)$ is compressed by the deflate compression, but the compression may be performed by any lossless compression process other than the deflate compression, and no compression may be performed.

In the embodiment, the texture area bias $E_{c,t}(x, y)$ and the non-texture area bias $F_{c,t}(x, y)$ are set from the bias $B_{c,t}(x, y)$, and the compression is performed thereon by different compression methods. However, in case of data used at the time of rendering by attaching the texture to the 3-dimensional model, the compression may be applied to data other than the bias $B_{c,t}(x, y)$.

In the embodiment, the vertical stripe pattern for the x coordinates and the horizontal stripe pattern for the y coordinates corresponding to the values of the bits when the coordinates (X, Y) are represented by binary numbers are used as the texture and attached to the 3-dimensional model to perform the rendering, and the image portrayal information is created by analyzing the rendering result. However, the used pattern is not limited thereto, a pattern in which shading (grayscale value) is gradually changed in the x coordinate direction (horizontal direction) and a pattern in which shading is gradually changed in the y coordinate direction (vertical direction) may be used. In this case, a pattern of a set number (n+2) obtained by the following formula (13) may be used instead of the vertical stripe pattern of set numbers (n+2) to (n+b+1) obtained by the formula (3), and a pattern of a set number (n+3) obtained by the following formula (14) may be used instead of the horizontal stripe pattern of set numbers (n+b+2) to (n+2b+1) obtained by the formula (4).

Formula 10

$$T_{c,n+2,j}(X,Y) = X - \tfrac{1}{2}b \tag{13}$$

$$T_{c,n+3,j}(X,Y) = Y - \tfrac{1}{2}b \tag{14}$$

c=1 to 3, j=1 to n, X=1 to $2^b$, Y=1 to $2^b$

Figure 15:
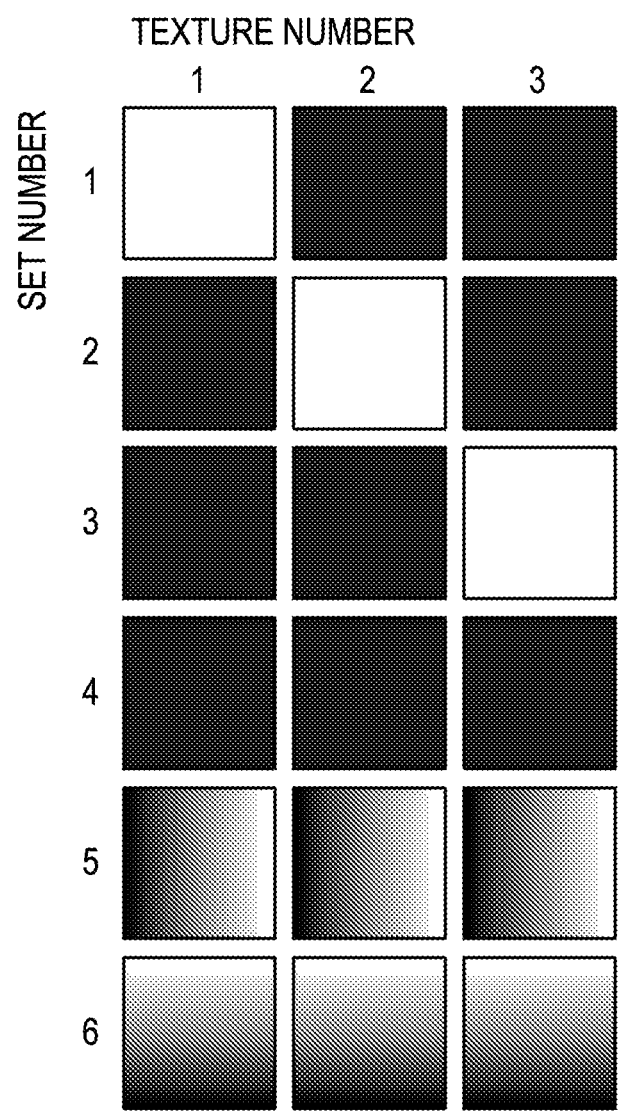
FIG. 15 is a diagram illustrating special textures according to a modified example.
Figure 16:
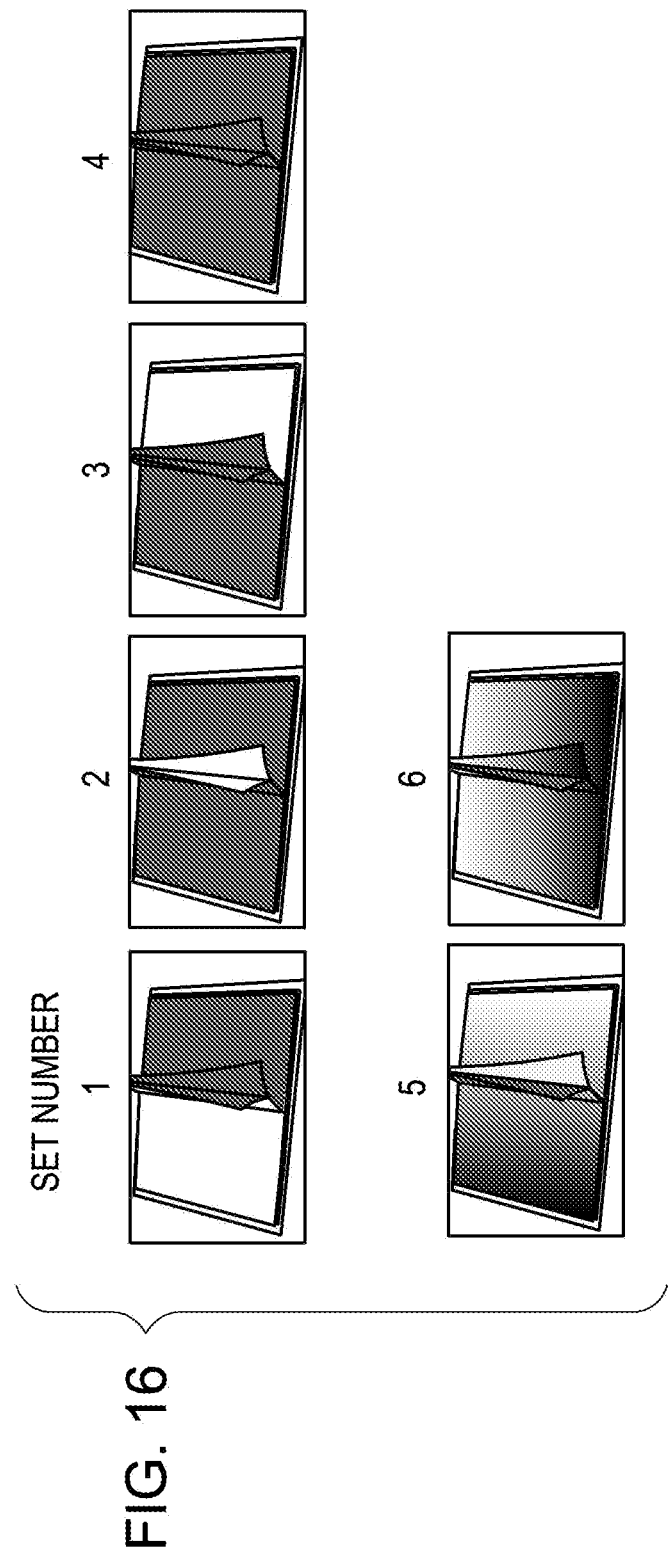
FIG. 16 is a diagram illustrating an aspect of rendering using the special textures according to the modified example.

In the case of using the pattern of the formula (13) and the pattern of the formula (14), the setting of the correspondence of the coordinates can be acquired by the following formula (15). FIG. 15 shows an example of the special textures, and FIG. 16 shows the rendering by attaching the special textures shown in FIG. 15 to the 3-dimensional model. With such a configuration, it is possible to reduce the number of textures to be created.

Formula 11

$$X_t(x,y) = \frac{\sum_{c=0}^{2} A_{c,n+2,t}(x,y) - \sum_{c=0}^{2} B_{c,t}(x,y)}{\sum_{c=0}^{2} G_{c,t}(x,y)} \times 2^b + 1 \tag{15}$$

$$Y_t(x,y) = \frac{\sum_{c=0}^{2} A_{c,n+3,t}(x,y) - \sum_{c=0}^{2} B_{c,t}(x,y)}{\sum_{c=0}^{2} G_{c,t}(x,y)} \times 2^b + 1$$

$t = 1$ to $T$, $x = 1$ to $w$, $y = 1$ to $h$

Figure 17:
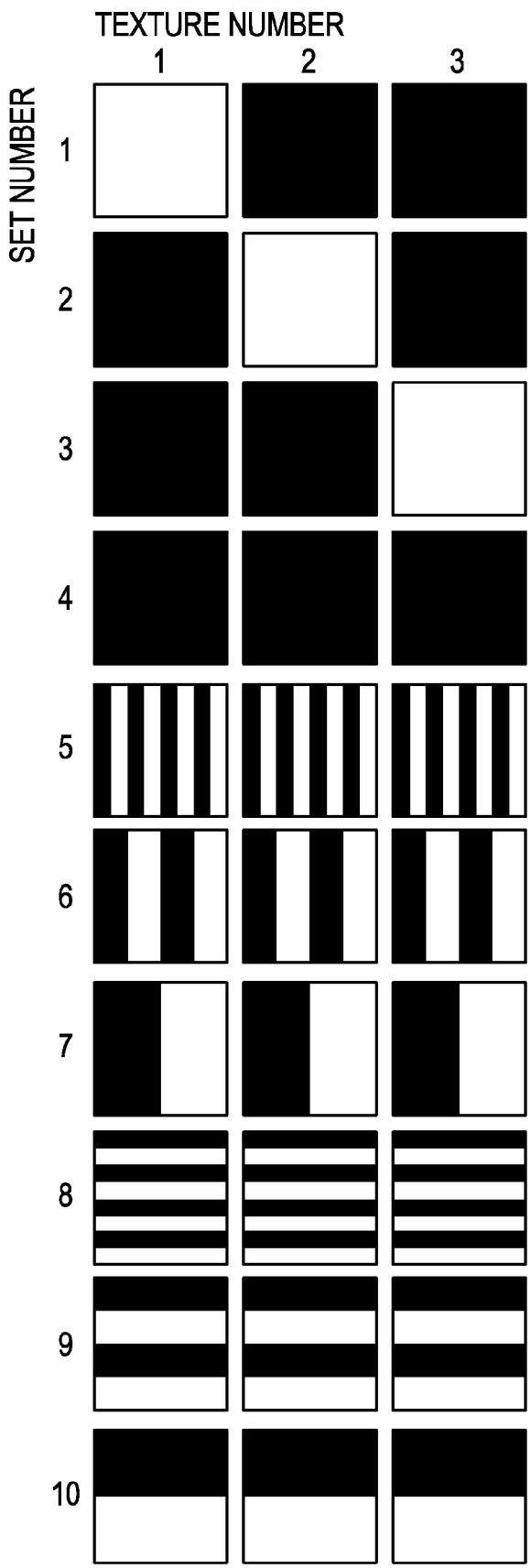
FIG. 17 is a diagram illustrating special textures according to a modified example.

In the embodiment, the target set number i corresponds to the value of each bit when the special textures of the vertical stripe pattern of the value (n+2) to the value (n+b+1) are represented by the reflected binary number, and the target set number i corresponds to the value of each bit when the special textures of the horizontal stripe pattern of the value (n+b+2) to the value (n+2b+1) are represented by the reflected binary number. However, such patterns may be created to correspond to the value of each bit when the coordinates are represented by general binary numbers. FIG. 17 shows an example of the special textures in this case.

In the embodiment, the image is reproduced by the viewer 40, but any apparatus such as a mobile phone having a liquid crystal display attached thereto and a printer may be used if it is an apparatus capable of reproducing an image.

The invention is not limited to the above-described embodiments, and obviously can be embodied with various aspects as long as they are belong to the technical scope of the invention.

What is claimed is:

1. An image processing method of processing image portrayal information used for rendering by attaching textures, the method comprising:

separating an image into a texture area to which the texture is attached and a non-texture area to which the texture is not attached, in a coordinate system of a rendering-completed image represented by the image portrayal information, wherein pixels of a part other than the non-texture area are interpolated by a predetermined interpolating process such that a pixel value is gradually changed from a boundary of the non-texture area;

compressing the image portrayal information of the non-texture area by a first compression method, wherein the image portrayal information after the interpolation is compressed by a JPEG compression method that is the first compression method;

compressing the image portrayal information of the texture area by a second compression method different from the first compression method, wherein the image portrayal information of the texture area is compressed by a lossless compression method that is the second compression method; and rendering by attaching a predetermined pattern with different grayscale values set for each coordinate to a 3-dimensional model as textures, wherein correspondence of coordinates of the rendering-completed image and coordinates of textures is set by analyzing a rendering-completed image obtained as a bitmap image by the rendering, and is stored as the image portrayal information, and further wherein a desired texture is disposed on the rendering-completed image on the basis of the stored image portrayal information at the time of displaying the desired texture as an image.

2. The image processing method according to claim 1, wherein the predetermined interpolating process is an interpolating process in which an area other than the non-texture area is filled with an average pixel value of adjacent pixels.

3. The image processing method according to claim 2, wherein the predetermined interpolating process is a interpolating process in which the image portrayal information is configured by a plurality of unit blocks with a predetermined size, an area other than the non-texture area is filled with an average pixel value of adjacent pixels with respect to a block, in which a part of the non-texture area is included, of the plurality of unit blocks, and all pixels of the unit blocks are filled with an average pixel value of pixels in the adjacent blocks with respect to a block, in which the non-texture area is not included.

4. The image processing method according to claim 1, wherein the correspondence is deduced from the grayscale value of each coordinate of the rendering-completed image by specifying coordinates of the corresponding predetermined pattern.

5. The image processing method according to claim 1, wherein the predetermined pattern is a pattern with the same number as a bit number when the texture coordinates are represented by binary numbers, each bit when coordinates are represented by binary numbers is associated with each pattern, and a grayscale value of each coordinate of each pattern is set to a value based on the value of the associated bit.

6. The image processing method according to claim 5, wherein the binary numbers are gray codes (reflected binary number).

7. The image processing method according to claim 1, wherein the rendering is performed by attaching a first solid painting pattern formed by solid painting with a minimum grayscale value to the 3-dimensional model in addition to a correspondence setting pattern for setting correspondence of coordinates of the rendering-completed image and coordinates of the textures as the predetermined pattern, wherein a bias value that is the grayscale value of the first solid painting pattern in the rendering-completed image is stored as the image portrayal information representing correspondence of a color of each pixel of the rendering-completed image and a color of each pixel of the texture image, and wherein the grayscale value of the desired texture is converted into the grayscale value of the rendering-completed image by offsetting on the basis of the stored bias value, and the rendering-completed image is displayed.

8. The image processing method according to claim 7, wherein pixels of a part other than the non-texture area are interpolated by a predetermined interpolating process such that a pixel value is gradually changed from a boundary of the non-texture area, and the bias value after the interpolating is compressed by a JPEG compression method that is the first compression method, and wherein the bias value of the texture area is compressed by a lossless compression method that is the second compression method.

9. The image processing method according to claim 1, wherein the rendering is performed by attaching a first solid painting pattern formed by solid painting with a minimum grayscale value and a second solid painting pattern formed by solid painting with a maximum grayscale value to the 3-dimensional model in addition to a correspondence setting pattern for setting correspondence of coordinates of the rendering-completed image and coordinates of the textures as the predetermined pattern, wherein a gain that is a difference of the grayscale value of the second solid painting pattern and the grayscale value of the first solid painting pattern in the rendering-completed image is calculated and stored as the image portrayal information representing correspondence of a color of each pixel of the rendering-completed image and a color of each pixel of the texture image, and wherein the grayscale value of the desired texture is converted into the grayscale value of the rendering-completed image on the basis of the stored gain and the rendering-completed image is displayed.

10. The image processing method according to claim 9, wherein when n (n is a natural number) textures are disposed on the rendering-completed image and the rendering-completed image is displayed, n sets formed of (n−1) sheets of the first solid painting pattern and 1 sheet of the second solid painting pattern are set, and a first set group with a different part where the second solid painting pattern is attached to the 3-dimensional model for each set and a second set formed of n sheets of the first solid painting pattern are attached to the 3-dimensional model for each set to perform rendering, and wherein the grayscale value of the rendering-completed image obtained by rendering the first set group for each set is compared with the grayscale value of the rendering-completed image obtained by rendering the second set for each set of the first set group to specify a texture area that is an area where the texture is attached to the 3-dimensional model, and a gain is calculated for the specified texture area.

11. The image processing method according to claim 1, wherein an image is portrayed by a frame unit and is displayed as a moving image.

12. An image processing apparatus for processing image portrayal information used for rendering by attaching textures, the apparatus comprising:

a separating unit that separates an image into a texture area to which the texture is attached and a non-texture area to which the texture is not attached, in a coordinate system of a rendering-completed image represented by the image portrayal information, wherein pixels of a part other than the non-texture area are interpolated by a predetermined interpolating process such that a pixel value is gradually changed from a boundary of the non-texture area;

a first compression unit that compresses the image portrayal information of the non-texture area by a first compression method, wherein the image portrayal information after the interpolation is compressed by a JPEG compression method that is the first compression method;

a second compression unit that compresses the image portrayal information of the texture area by a second compression method different from the first compression method, wherein the image portrayal information of the texture area is compressed by a lossless compression method that is the second compression method; and a rendering unit that renders by attaching a predetermined pattern with different grayscale values set for each coordinate to a 3-dimensional model as textures, wherein correspondence of coordinates of the rendering-completed image and coordinates of textures is set by analyzing a rendering-completed image obtained as a bitmap image by the rendering, and is stored as the image portrayal information, and further wherein a desired texture is disposed on the rendering-completed image on the basis of the stored image portrayal information at the time of displaying the desired texture as an image.

* * * * *